(12) United States Patent
Shima

(10) Patent No.: US 7,224,482 B2
(45) Date of Patent: May 29, 2007

(54) PRINTER HOST AND STORAGE MEDIUM STORING OPERATION PROGRAM OF THE PRINTER HOST

(75) Inventor: Shuichi Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1000 days.

(21) Appl. No.: 09/950,349

(22) Filed: Sep. 11, 2001

(65) Prior Publication Data
US 2002/0036665 A1    Mar. 28, 2002

(30) Foreign Application Priority Data
Sep. 11, 2000 (JP) ............ P2000-274876

(51) Int. Cl.
G06F 15/00 (2006.01)
(52) U.S. Cl. .............. 358/1.18; 358/3.12; 358/1.2
(58) Field of Classification Search .............. 358/1.18, 358/3.12, 1.2; 347/5, 9
See application file for complete search history.

(56) References Cited
U.S. PATENT DOCUMENTS
5,745,659 A * 4/1998 Rigau Rigau et al. ....... 358/1.2
6,109,745 A * 8/2000 Wen ........................ 347/101
2003/0152729 A1* 8/2003 Hirasawa ................. 428/40.1

FOREIGN PATENT DOCUMENTS

| EP | 707 973 A | 4/1996 |
|---|---|---|
| EP | 707973 | 4/1996 |
| EP | 767 066 A | 4/1997 |
| EP | 767066 | 4/1997 |
| EP | 905 647 A | 3/1999 |
| EP | 1 186 993 A | 3/2002 |
| JP | 9-073136 | 3/1997 |
| JP | 11-254657 | 9/1999 |
| JP | 2000-118058 | 4/2000 |

* cited by examiner

Primary Examiner—Douglas Q. Tran
Assistant Examiner—Chan S. Park
(74) Attorney, Agent, or Firm—Mattingly, Stanger, Malur & Brundidge, P.C.

(57) ABSTRACT

A printer host has a marginless printing mode designation accepting portion for accepting a marginless printing mode designation, a marginless printing condition setting portion for setting an expand printing region of a size that is larger than a size of actual printing paper to be printed, a renderer for converting drawing data, which is stored in a spool file, to a printing command so that a printer performs printing on this expanded printing region, a halftone processing portion, and a data-to-command conversion portion.

8 Claims, 18 Drawing Sheets

FIG. 10

| | DIRECTION | FRONTWARD | | REARWARD | | LATERAL | |
|---|---|---|---|---|---|---|---|
| | SIZE | A4 | A3 | A4 | A3 | A4 | A3 |
| MODEL A | | 2 | 3 | 3 | 5 | 2 | 2.5 |
| MODEL B | | 0.5 | 1 | 2 | 3 | 1.5 | 2.5 |
| MODEL C | | 1 | 2 | 2 | 3 | 2 | 2.5 |
| MAXIMUM | | 3 | | 5 | | 2.5 | |

(IN mm)

PRINTER HOST AND STORAGE MEDIUM STORING OPERATION PROGRAM OF THE PRINTER HOST

BACKGROUND OF THE INVENTION

1. Field of the Invention

The present invention relates to a printer host for performing marginless printing, and to a storage medium for storing an operation program of the printer host.

The present application is based on Japanese Patent Application No. 2000-274876, which is incorporated herein by reference.

2. Description of the Related Art

In recent years, the development of techniques for implementing marginless printing in an ink jet printer has been pursued. One such technique is to first form an ink receiving opening in a platen of the ink jet printer and to then spray ink droplets from a print head onto an edge part of printing paper when the edge part there of is located above the ink receiving opening, and to subsequently receive ink droplets, which are not impinged onto the edge part there of, in the ink receiving opening thereby to print the edge part of the printing paper without smearing the ink on the platen. When this marginless printing is performed, it is necessary for a printer to inject ink onto a region whose size is slightly larger than that of printing paper. Thus, after a user prepares a document of a size that is slightly larger than the size of printing paper, for example, A4 size, the user needs to set a printing paper size and a printing region size at values, each of which is slightly larger than A4 size, for a printer driver.

However, such conventional techniques have a drawback in that it is very troublesome for a user to set a printing paper size and a printing region size at values, each of which is slightly larger than A4 size, for a printer driver, as described above, when marginless printing is performed on A4-size printing paper.

SUMMARY OF THE INVENTION

The invention is accomplished in view of the drawback of such conventional techniques. Accordingly, an object of the invention is to provide a printer host enabled to lighten a burden imposed on a user when marginless printing is performed, and to provide a storage medium that stores an operation program of such a printer host.

To achieve the foregoing object, according to an aspect of the invention, there is provided a first printer host for converting drawing data, which is created by an application program and corresponds to a sheet of printing paper, whose size is larger than a specific size of a sheet of printing paper to be actually printed, to a printing command and for transmitting the printing command to a printer. This printer host comprises paper size data accepting means for accepting data designating the specific size of a sheet of printing paper to be actually printed, marginless printing mode designation accepting means for accepting a marginless printing mode designation, marginless printing condition setting means for setting, when a marginless printing mode designation is accepted by the marginless printing mode designation accepting means, a printing region of a size that is larger than the specific size of printing paper to be actually printed, and printing command generating means for converting the drawing data to a printing command so that the printer performs printing within the printing region set by the marginless printing condition setting means.

To achieve the foregoing object, according to another aspect of the invention, there is provided a second printer host for converting drawing data, which is created by an application program and corresponds to a sheet of printing paper, whose size is larger than a specific size of a sheet of printing paper to be actually printed, to a printing command and for transmitting the printing command to a printer. This printer host comprises marginless printing mode designation accepting means for accepting a marginless printing mode designation, marginless printing condition setting means for setting, when a marginless printing mode designation is accepted by the marginless printing mode designation accepting means, a printing region of a size that is larger than the specific size of printing paper to be actually printed, and printing command generating means for converting the drawing data to a printing command so that an image represented by the drawing data is enlarged according to a size of the printing region set by the marginless printing condition setting means, and that the printer performs printing within the printing region set by the marginless printing condition setting means.

To achieve the foregoing object, according to another aspect of the invention, there is provided a first storage medium storing an operation program of a printer host for converting drawing data, which is created by an application program and corresponds to a sheet of printing paper, whose size is larger than a specific size of a sheet of printing paper to be actually printed, to a printing command and for transmitting the printing command to a printer. This operation program comprises a paper size data accepting step of accepting data designating the specific size of a sheet of printing paper to be actually printed, a marginless printing mode designation accepting step of accepting a marginless printing mode designation, a marginless printing condition setting step of setting, when a marginless printing mode designation is accepted in the marginless printing mode designation accepting step, a printing region of a size that is larger than the specific size of printing paper to be actually printed, and a printing command generating step of converting the drawing data to a printing command so that the printer performs printing within the printing region.

To achieve the foregoing object, according to another aspect of the invention, there is provided a second storage medium storing an operation program of a printer host for converting drawing data, which is created by an application program and corresponds to a sheet of printing paper, whose size is larger than a specific size of a sheet of printing paper to be actually printed, to a printing command and for transmitting the printing command to a printer. This operation program comprises a marginless printing mode designation accepting step of accepting a marginless printing mode designation, a marginless printing condition setting step of setting, when a marginless printing mode designation is accepted in the marginless printing mode designation accepting step, a printing region of a size that is larger than the specific size of printing paper to be actually printed, and a printing command generating step of converting the drawing data to a printing command so that an image represented by the drawing data is enlarged according to a size of the printing region set in the marginless printing condition setting step, and that the printer performs printing within the printing region.

To achieve the foregoing object, there is provided a third storage medium, which is an embodiment of the second storage medium and stores the operation program of the printer host. In the third storage medium, data representing a necessary minimum expanded amount corresponding to each of sizes of printing paper to be used for performing marginless printing in the printer connected to the printer host is preliminarily stored. Further, according to the operation program, a necessary minimum printing area is determined as the printing region according to the necessary minimum expanded amount corresponding to the printing paper of the specific size, which is actually printed, and an enlarged image region, which circumscribes the necessary minimum printing region and is similar to the printing paper, is also determined in the marginless printing condition setting step. Moreover, in the printing command generating step, an image represented by the drawing data is enlarged at a ratio of enlargement of a size of the enlarged image region to the specific size of the printing paper and the drawing data is converted into the printing command so that the printer performs printing within the necessary minimum printing area determined as the printing region in the printing command generating step.

To achieve the foregoing object, there is provided a fourth storage medium, which is an embodiment of the third storage medium and stores the operation program of the printer host. According to the operation program stored in the third storage medium, an expanded amount of the printing region is a maximum expanded amount among necessary minimum expanded amounts respectively corresponding to marginless printing operations performed on printing paper of sizes by printers. Moreover, a necessary minimum printing area is determined according to the maximum expanded amount corresponding to the printing paper of the specific size, which is actually printed, and an enlarged image region, which circumscribes the necessary minimum printing region and is similar to the printing paper, is also determined in the marginless printing condition setting step. Furthermore, in the printing command generating step, an image represented by the drawing data is enlarged at a ratio of enlargement of a size of the enlarged image region to the specific size of the printing paper and the drawing data is converted into the printing command so that the printer performs printing within the necessary minimum printing area determined as the printing region in the printing command generating step.

To achieve the foregoing object, there is provided a fifth storage medium, which is an embodiment of the first or second storage medium and stores the operation program of the printer host, in which an expanded amount of the printing region set in the marginless printing condition setting step correspondingly to the specific size of printing paper to be actually printed is constant even when the specific size there of changes.

To achieve the foregoing object, there is provided a sixth storage medium, which is an embodiment of the fifth storage medium and adapted to store the operation program of the printer host, in which the expanded amount of the printing region is a maximum expanded amount among necessary minimum expanded amounts respectively corresponding to marginless printing operations performed on printing paper of sizes by printers, and adapted to preliminarily store data representing a necessary minimum expanded amount corresponding to each of sizes of printing paper to be used for performing marginless printing is preliminarily stored in the printer connected to the printer host, in which, in the marginless printing condition setting step, when the expanded amount of the printing region is larger than the necessary minimum expanded amount corresponding to the printing paper of the specific size to be actually printed, a portion extending from an end of the printing region to a place corresponding to the difference between the expanded amount of the printing region and the necessary minimum expanded amount is determined as a non-printing region, and in which, in the printing command generating step, a command, which indicates that the non-printing region has no print data, is generated as the printing command.

To achieve the foregoing object, there is provided a seventh storage medium, which is an embodiment of the fifth storage medium and adapted to store the operation program of the printer host, in which the expanded amount of the printing region is a maximum expanded amount among necessary minimum expanded amounts respectively corresponding to marginless printing operations performed on printing paper of sizes by printers, and adapted to preliminarily store data representing a necessary minimum expanded amount corresponding to each of sizes of printing paper to be used for performing marginless printing is preliminarily stored in the printer connected to the printer host, and in which, in the marginless printing condition setting step, when the expanded amount of the printing region is larger than the necessary minimum expanded amount corresponding to the printing paper of the specific size to be actually printed, a dimension of a necessary minimum printing region at marginless printing is determined from the specific size of the printing paper to be actually printed and from the necessary minimum expanded amount, and in which, in the printing command generating step, the dimension of the necessary minimum printing region, which is determined in the marginless printing condition setting step, is converted into a command to thereby inhibit the printer from printing outside of an area determined by the dimension of the necessary minimum printing region.

Incidentally, in the case of the first and second printer hosts and the first to seventh storage media, either of an ink jet printer and a laser printer may be employed as the printer connected to the printer host.

To achieve the foregoing object, there is provided an eighth storage medium, which is an embodiment of one of the first to seventh embodiments and adapted to store the operation program of the printer host for transmitting the printing command to a printer provided with a print head having a plurality of nozzles arranged in a paper feed direction and with a platen, in which a paper-feed-side ink receiving opening and a paper-discharge-side ink receiving opening are formed in such a manner as to extend in a direction perpendicular to the paper feed direction, disposed in such a way as to face the print head. Further, the operation program is adapted so that when a marginless printing mode designation is accepted in the marginless printing mode designation accepting step, a command causing only the nozzles, the ink sprayed from which is received by one of the paper-feed-side ink receiving opening and the paper-discharge-side ink receiving opening, of the plurality of nozzles of the print head to spray ink, is generated as the printing command, during a front end portion in the paper feed direction of the printing paper is printed, in the printing command generating step, and also causing only the nozzles, the ink sprayed from which is received by the other of the paper-feed-side ink receiving opening and the paper-discharge-side ink receiving opening, of the plurality of nozzles of the print head to spray ink, is generated as the printing command, during a rear end portion in the paper feed direction of the printing paper is printed, in the printing command generating step.

To achieve the foregoing object, according to another aspect of the invention, there is provided a suitable storage medium adapted to store an application program for creating a document. This application program comprises a printing region data acquiring step of acquiring printing region data, which represents a printing region of each of standardized paper sizes set by a printer driver that is operative to control a printer, and expanded printing region data representing an expanded printing region of a size, which is related to and larger than each of the standardized paper sizes, from the printer driver, a marginless printing mode designation accepting step of accepting a marginless printing mode designation data, a paper size data accepting step of accepting paper size data representing a standardized size of printing paper to be actually printed, and a printing region setting step of setting the printing region of the standardized paper size in a case that no marginless printing mode designation is accepted in the marginless printing mode designation step and that data representing the standardized paper size of printing paper to be actually printed is accepted in the paper size data accepting step, and setting the expanded printing region related to a standardized paper size in a case that a marginless printing mode designation is accepted in the marginless printing mode designation step and that data representing the standardized paper size of printing paper to be actually printed is accepted in the paper size data accepting step.

Features and advantages of the invention will be evident from the following detailed description of the preferred embodiments described in conjunction with the attached drawings.

BRIEF DESCRIPTION OF THE DRAWINGS

In the accompanying drawings:

FIG. 10 is a table illustrating a necessary minimum amount of a part expanded from printing paper correspondingly to each of combinations of printer models, printing paper sizes, and directions with respect to the printing paper so as to perform marginless printing;

DETAILED DESCRIPTION OF THE PREFERRED EMBODIMENTS

Hereinafter, various printer systems according to the invention, that is, embodiments of the invention are described with reference to the accompanying drawings.

First, one such a printer system according to the invention, which is a first embodiment of the invention, is described hereinbelow with reference to FIGS. 1 to 10.

Figure 1:
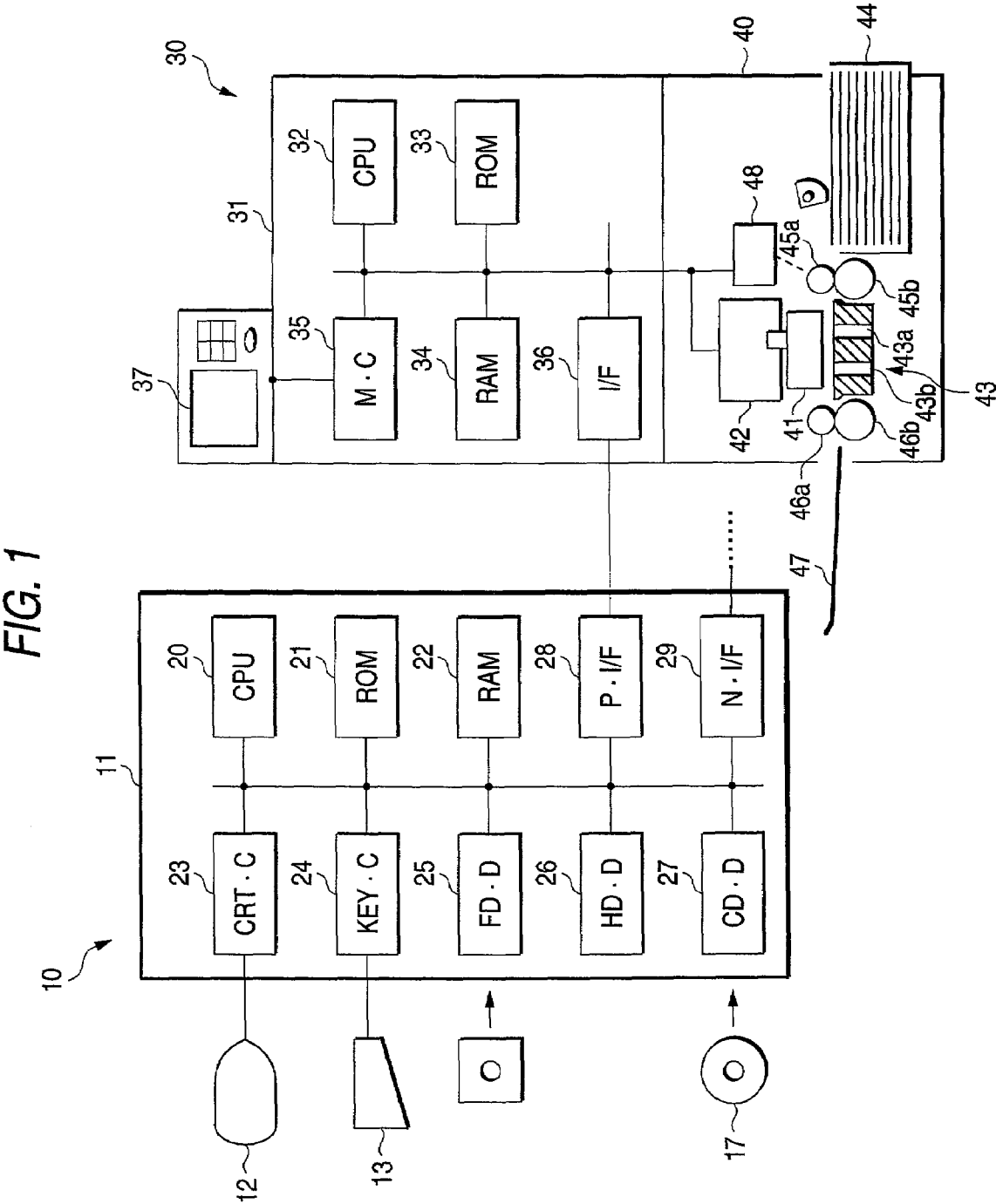
FIG. 1 is a circuit block diagram illustrating a printer system that is a first embodiment of the invention.

As shown in FIG. 1, the printer system of this embodiment has a printer host 10 and an ink jet printer 30 adapted to print according to a printing command outputted from this printer host 10.

The printer host 10 has a main unit 11 there of, a display unit 12, and a keyboard 13. The main unit 11 of the host 10 has a CPU 20 for executing various programs, a ROM 21 for storing various data and programs, a RAM 22 for temporarily storing various data and programs, a display controller 23 for controlling the display unit 12, a keyboard controller 24 for controlling the keyboard 13, a floppy disk drive 25, a hard disk drive 26, a CD-ROM drive 27, a printer interface 28, and a network interface 29.

The printer 30 has a monitor 37, a printing mechanism 40, and a print controller 31. The print controller 31 has a CPU 32 for executing various programs, a ROM 33 for storing various data and programs, a RAM 34 for tentatively storing various data and programs, a monitor controller 35 for controlling the monitor 37, and an interface 36.

The printing mechanism 40 has a print head 41, a carriage 42 for moving this print head 41, a platen 43 disposed in such a way as to face the print head 41, a paper cassette 44 for accommodating a plurality of sheets of printing paper, paper feed rollers 45a and 45b for conveying the printing paper, which is stored in this paper cassette 44, onto the platen 43 (having a plurality of transversal ink receiving openings 43a and 43b), paper discharge rollers 46a and 46b for discharging printed paper, a paper discharge tray 47 for receiving discharged paper, and a sensor 48 for detecting the driven amount of each of the paper feed rollers 45a and 45b.

Figure 2:
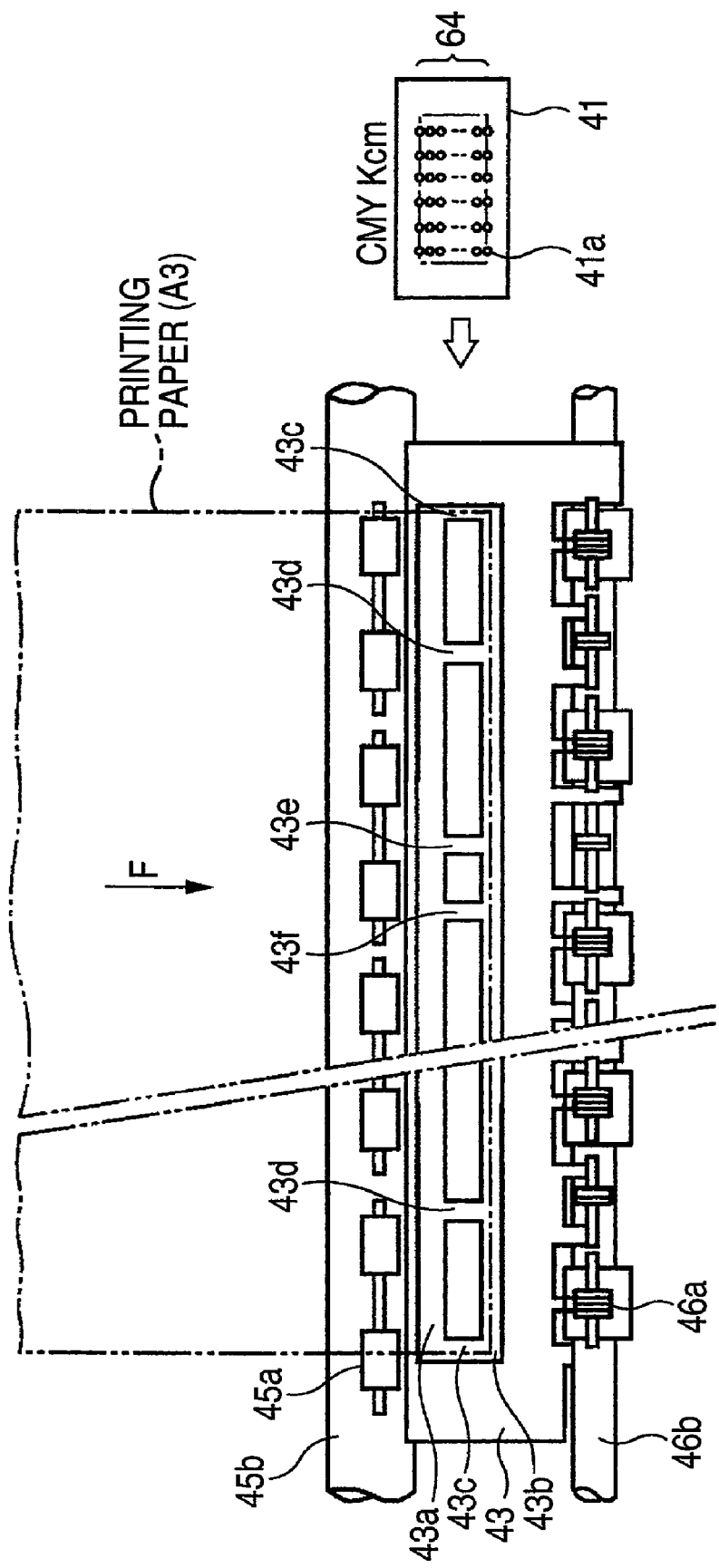
FIG. 2 is a plan diagram illustrating a platen and surroundings there of in the printer system that is the first embodiment of the invention.

As shown in FIG. 2, a plurality of longitudinal ink receiving openings 43c, 43d, 43e, 43f extending in a direction parallel to a paper feed direction F and a plurality of transversal ink receiving openings 43a and 43b extending in a direction (that is, a scanning direction) perpendicular to the paper feed direction F are formed in the platen 43. The plurality of longitudinal ink receiving openings 43c, 43d, 43e, 43f include a pair of A3-size paper printing ink receiving openings 43c disposed so that the lateral ends of A3-size printing paper pass just thereabove, a pair of B4-size paper printing ink receiving openings 43d disposed so that the lateral ends of B4-size printing paper pass just thereabove, a pair of A4-size paper printing ink receiving openings 43e disposed so that the lateral ends of A4-size printing paper pass just thereabove, and a pair of B5-size paper printing ink receiving openings 43f disposed so that the lateral ends of B5-size printing paper pass just thereabove. Moreover, the plurality of transversal ink receiving openings 43a, 43b include the paper-feed-side ink receiving opening 43a positioned in a paper-feed-side portion, and the paper-discharge-side ink receiving openings 43b positioned in a paper-discharge-side portion. Ink absorbing materials are put in each of theses openings.

Nozzles 41a respectively corresponding to ink colors, concretely, C (cyan), M (magenta), Y (yellow), K (black), c (light cyan), and m (light magenta) are arranged in a scanning direction. Furthermore, 64 nozzles 41a corresponding to the same color are provided therein in such a way as to be arranged in the paper feed direction.

Figure 5:
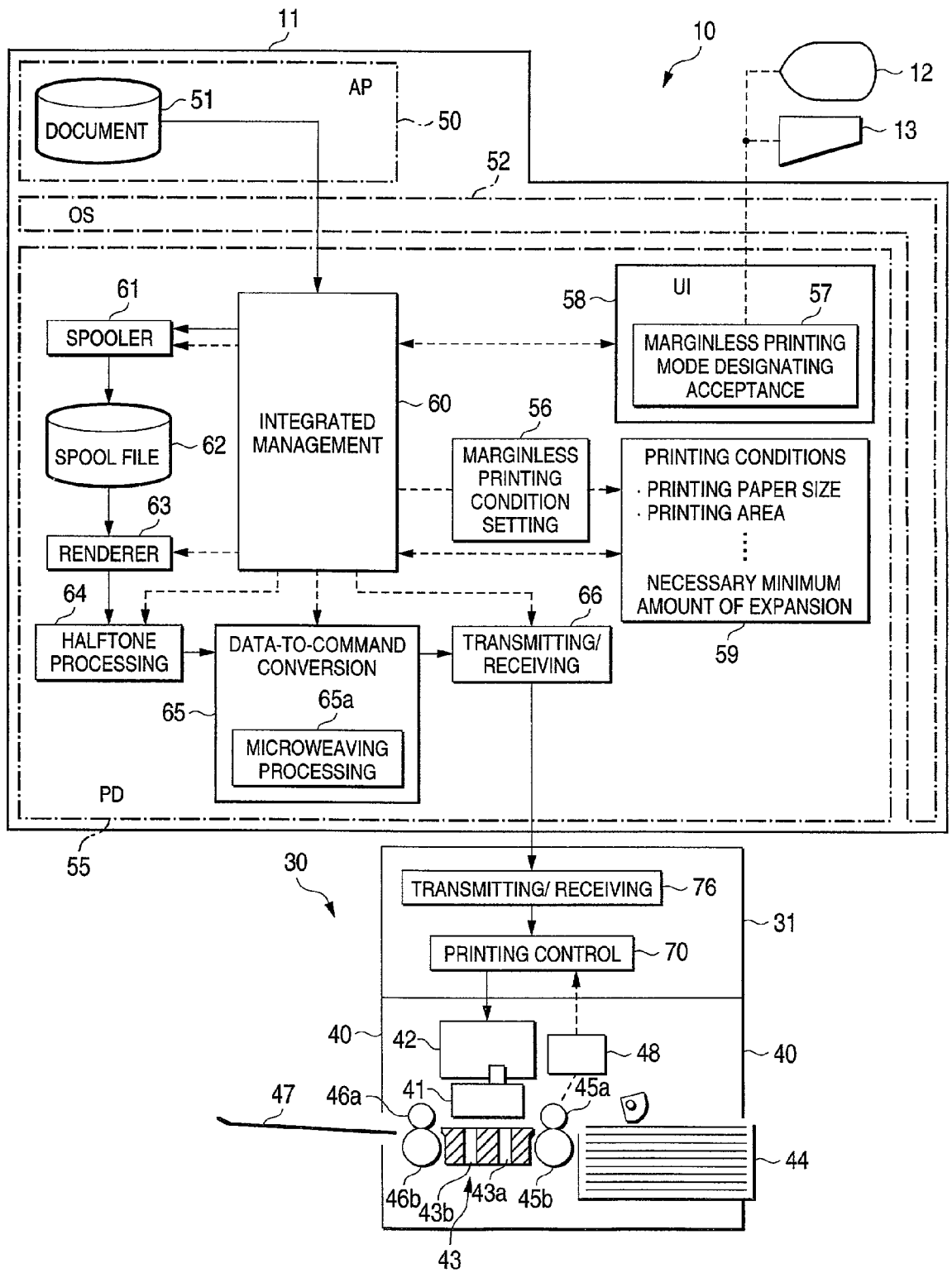
FIG. 5 is a functional block diagram illustrating the printer system that is the first embodiment of the invention.
Figure 6:
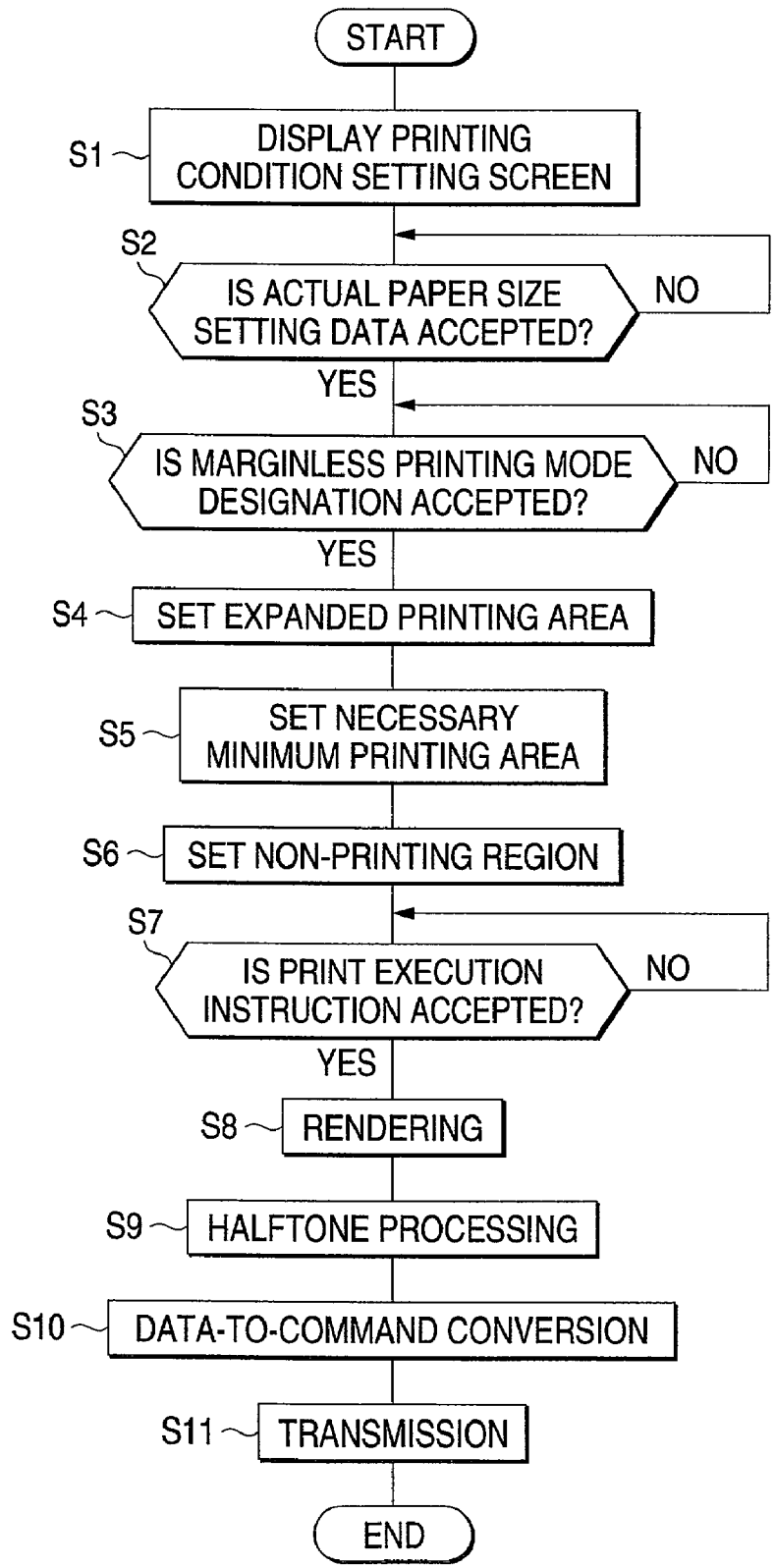
FIG. 6 is a flowchart illustrating an operation of a printer driver of the first embodiment of the invention.

Further, as shown in FIG. 5, the main unit 11 of the host 10 has the following functional constituent elements, that is, an application program 50, an operating system 52, and a printer driver 55. Furthermore, the printer driver 55 has the following functional components, that is, a spooler 61 adapted to receive data representing a document 51 created by the application program 50 and to spool this data into a spool file 62, a renderer 63 for generating RGB data from drawing data, which represents a document stored in the spool file 62, a halftone processing portion 64 for converting RGB image data into CMYKcm binary image data and for performing halftone processing thereon, a data-to-command conversion portion 65 for converting CMYKcm binary image data into a printing command that can be interpreted by the printer 30, a transmitting/receiving portion 66 for transmitting this printing command to the printer 30, a user interface 58 for interfacing to the display unit 12 and the keyboard 13 when printing is performed, a marginless printing condition setting portion 56 for setting printing conditions when marginless printing is performed, an integrated management portion 60 for integratively managing these constituent elements, and a printing condition file 59 for storing data representing the printing conditions. The user interface 58 has a marginless printing mode designation accepting portion 57 for accepting data, which represents a marginless printing mode designation, from a user. The data-to-command conversion portion 65 has a microweaving processing portion 65a that is operative to determine what raster should be printed among those represented by the CMYKcm binary image data, and at what pass interval the raster should be printed.

Incidentally, each of the functional constituent elements of the main unit 11 of the host 10 is constructed in such a way as to have a RAM 22, in which various programs are stored, and also have a CPU 20 for executing the programs stored in this RAM 22. That is, each of the aforementioned functional constituent elements functions by reproducing the programs relating to the function there of, which are stored in the CD-ROM 17 (shown in FIG. 1) through the use of the CD-ROM drive 27 and then loading the programs into the RAM 22 and subsequently executing these programs by means of the CPU 20.

The print controller 31 of the printer 30 has the following functional constituent elements, that is, a transmitting/receiving portion 76 for accepting a printing command sent from the printer host 10, and a print control portion 70 for controlling the printing mechanism according to the printing command accepted by this transmitting/receiving portion 76.

Next, an operation of the printer host 10 of this embodiment during printing is described here in below.

For instance, when marginless printing is performed on A3-size printing paper, it is necessary for reliably printing an edge portion of this A3-size printing paper to create a document corresponding to a region of a size that is some what larger than A3-size. Thus, when the user creates a document by utilizing the application program 50, the user selects a "nonstandardized size" or a "custom paper size" in a printing paper size setting stage as the size of the printing paper to be used. Hence, the user sets the printing paper size in such a manner as to be the same size as A3-size paper expanded printing region (to be described later). Furthermore, the user creates a document 51 within a region of this size of the printing paper. Incidentally, in this case, the user sets the printing region so that the size of the printing region is the same as the entire nonstandardized size or the entire custom paper size.

Upon completion of creation of this document 51, the user activates the printer driver 55 so as to print this document 51. Hereinafter, an operation of this printer driver 55 is described with reference to a flowchart of FIG. 6.

Figure 8:
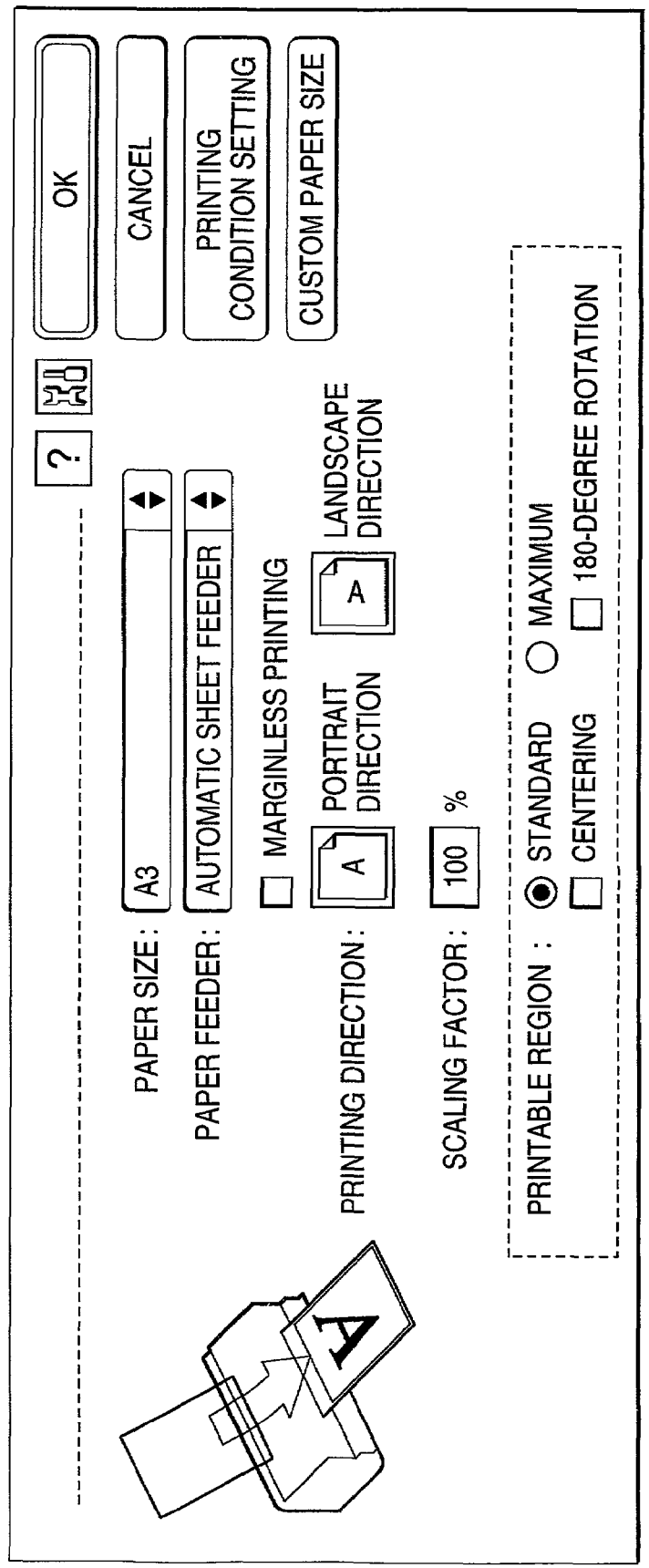
FIG. 8 is a diagram illustrating a printing condition setting screen of the first embodiment of the invention.

When the printer driver 55 is activated, a printing condition setting display shown in FIG. 8 is indicated on the screen of the display unit 12 by the user interface 58 in step S1. The user interface 58 accepts data for setting the paper size of printing paper to be actually printed, from the user in step S2, and also accepts a "marginless printing mode designation" there from in step S3. Such printing conditions are recorded in the printing condition file 59 by the integrated management portion 60. When the "marginless printing mode designation" is accepted, the integrated management portion 60 instructs the marginless printing condition setting portion 56 to be activated and set the expanded printing region in step S4.

Figure 9:
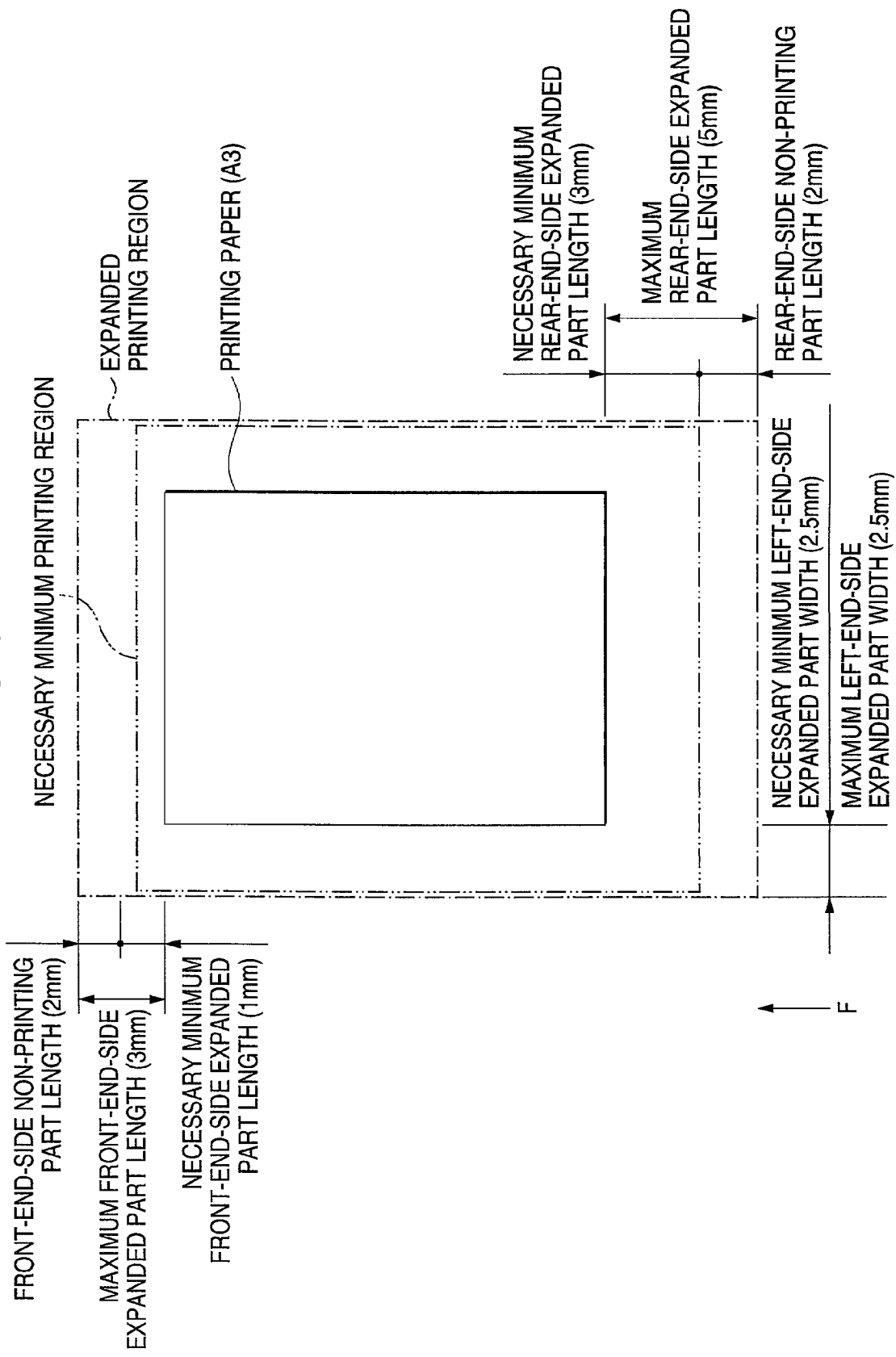
FIG. 9 is a diagram illustrating the relation between a sheet of printing paper and an expanded printing region of the first embodiment of the invention.

This expanded printing region is determined by setting a constant expanded amount in each of various directions with respect to the printing paper. As shown in FIG. 9, for example, when the size of the printing to be actually printed is A3-size, the expanded amount at the front end side there of in the paper feed direction F of FIG. 9 is 3 mm, and the expanded amount at the rear end side there of is 15 mm, and the expanded amount at the lateral-end-side is 2.5 mm. Incidentally, when a document is created, this size of the expanded printing region is set as the size of the printing paper.

As shown in FIG. 10, the necessary minimum expanded amount at the time of performing marginless printing changes depending upon the models (A, B, C) of the printer, the sizes (A3, A4) of the printing paper to be actually printed, and the enlargement directions (that is, forward, rearward, and lateral directions) with respect to the printing paper to be actually printed. This is because the necessary minimum expanded amount is determined by the skew of the printing paper, and by the paper feed amount tolerance. In this embodiment, among various expanded amounts varying with the model of the printer and the printing paper size, the maximum expanded amount in each of the direction is employed as the expanded amount in each of the directions, which is used for setting the expanded printing region. That is, the expanded amount in each of the directions is always constant, regardless of the model of the printer and the printing paper size. Namely, the expanded amount at the front end side in the paper feed direction is 3 mm. The expanded amount at the rear end side is 5 mm. The expanded amount at each of the lateral end sides is 2.5 mm.

In this way, this embodiment is adapted so that the expanded amounts in all the directions are equal to one another even when the model of the printer is changed and even when the size of the printing paper is altered. This is because users can easily set the printing paper size without being confused when the expanded amounts at the time of performing marginless printing correspondingly to the sizes of the printing paper are equal to one another in a stage, in which the printing paper size is set before the application program 50 creates a document. Furthermore, even when a document created for a certain printer is printed by using another printer, the expanded amounts of the regions respectively corresponding to the models of the printers are equal to one another. This eliminates the necessity for remaking the document when the size of the region for creating the document is changed.

However, the size of the expanded printing region, which is determined as described above, is larger than the necessary minimum printing region size in the case of performing marginless printing on the printing paper of a specific size by using a specific model of the printer. Thus, when marginless printing is actually performed, the relative movement amount of the print head is large. Therefore, a printing time is long. Moreover, the quantity of consumed ink is large. Practically, in the case that marginless printing is performed on A3-size printing paper by using the model B of the printer as shown in FIG. 10, the front-end-side necessary minimum expanded amount is 1 mm, and the rear-end-side necessary minimum expanded amount is 3 mm, and the lateral-end-side necessary expanded amount is 2.5 mm, as illustrated in FIGS. 9 and 10. Thus, the expanded printing region is larger than A3-size printing paper by 2 mm at the front end side, and by 2 mm at the rear end side, and by 0 mm at the lateral sides.

Thus, in this embodiment, the necessary minimum printing region is determined in step S5 in the case that marginless printing is performed on the actual printing paper of the actual size by using a printer actually connected thereto after the marginless printing condition setting portion 56 sets the expanded printing region. In the printing condition file 59, the necessary minimum expanded amount corresponding to each of sizes of the printing paper for the connected printer and the aforementioned maximum expanded amount are recorded. The marginless printing condition setting portion 56 refers to the data recorded therein and determines the size of the necessary minimum printing region in the case that the marginless printing is performed on the printing paper of the size, which is actually printed by the printer actually connected thereto. Incidentally, various kinds of expanded amounts, which are recorded in the printing condition file 59, are preliminarily stored in the storage medium that provides the software of the printer driver 55.

After the necessary minimum printing region is determined in step S5, the marginless printing condition setting portion 56 determines a portion, which is located in the expanded printing region determined in step S4 and extends from an end of this expanded printing region to a position corresponding to the difference between the expanded amount of the expanded printing region and the necessary minimum expanded amount, as a non-printing region in step S6. Incidentally, the non-printing region obtained this time is provided at the front end side in the paper feed direction F. Practically, the non-printing amount of the front-end-side non-printing region in the case of performing marginless printing on A3-size printing paper is a value (2 mm) obtained by subtracting the front-end-side necessary minimum expanded amount (1 mm) from the maximum front-end-side expanded amount (3 mm) employed for setting the expanded printing region.

The user interface 58 waits for a printing execution instruction to be issued from a user. When the user interface 58 accepts the printing execution instruction, the user interface 58 informs the integrated management portion 60 of such a fact in step S7. The integrated management portion 60 causes the renderer 63 to convert the drawing data, which constitutes the document stored in the spool file 62, into RGB image data in step S8 when accepting the printing execution instruction from the user interface 58. Subsequently, the halftone processing portion is caused to convert this RGB image data to CMYKcm binary image data and perform halftone processing thereon in step S9. Then, the integrated management portion 60 causes the data-to-command conversion portion 65 to convert the CMYKcm binary image data into a printing command, which can be interpreted by the printer 30, according to the printing conditions set as described above in step S10. Subsequently, the transmitting/receiving portion 66 is caused to transmit this printing command to the printer 30 in step S11.

Figure 7:
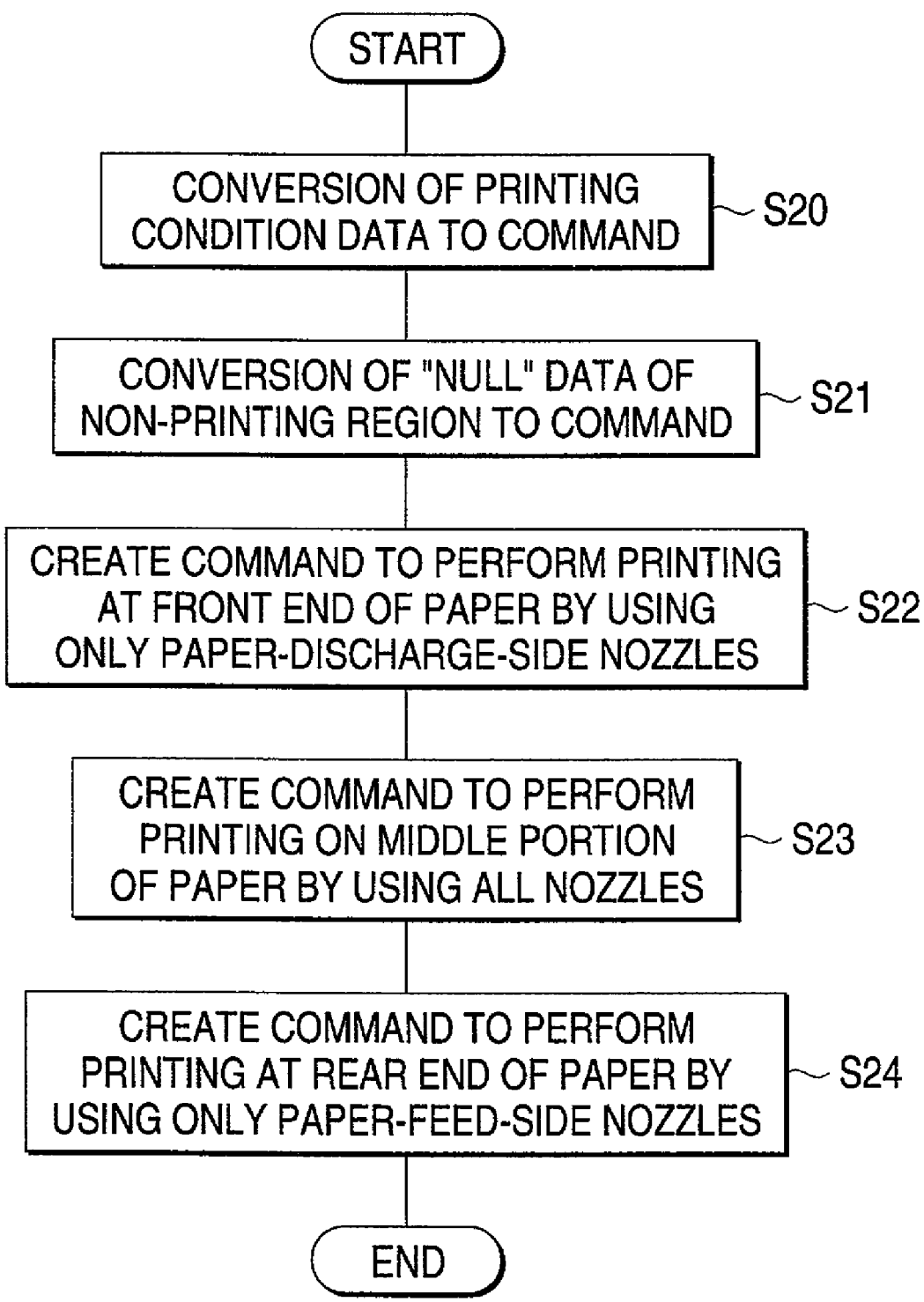
FIG. 7 is a flowchart illustrating an operation of a data-to-command conversion portion of the first embodiment of the invention.

As illustrated in a flowchart of FIG. 7, the data-to-command portion 65 for performing the data-to-command conversion in step S10 is caused to first convert the data representing various printing conditions into command in step S20. During this conversion, data representing the dimension or size in the paper feed direction of the necessary minimum printing region set in step S5 is converted into commands.

Subsequently, the microweaving processing portion 65a of the data-to-command conversion portion 65 converts data, which indicates that the non-printing region determined in the expanded printing region in step S6 has no data to be printed and is replaced with "null" data, into a command in step S21 so as to convert CMYKcm binary image data into commands.

Figure 3:
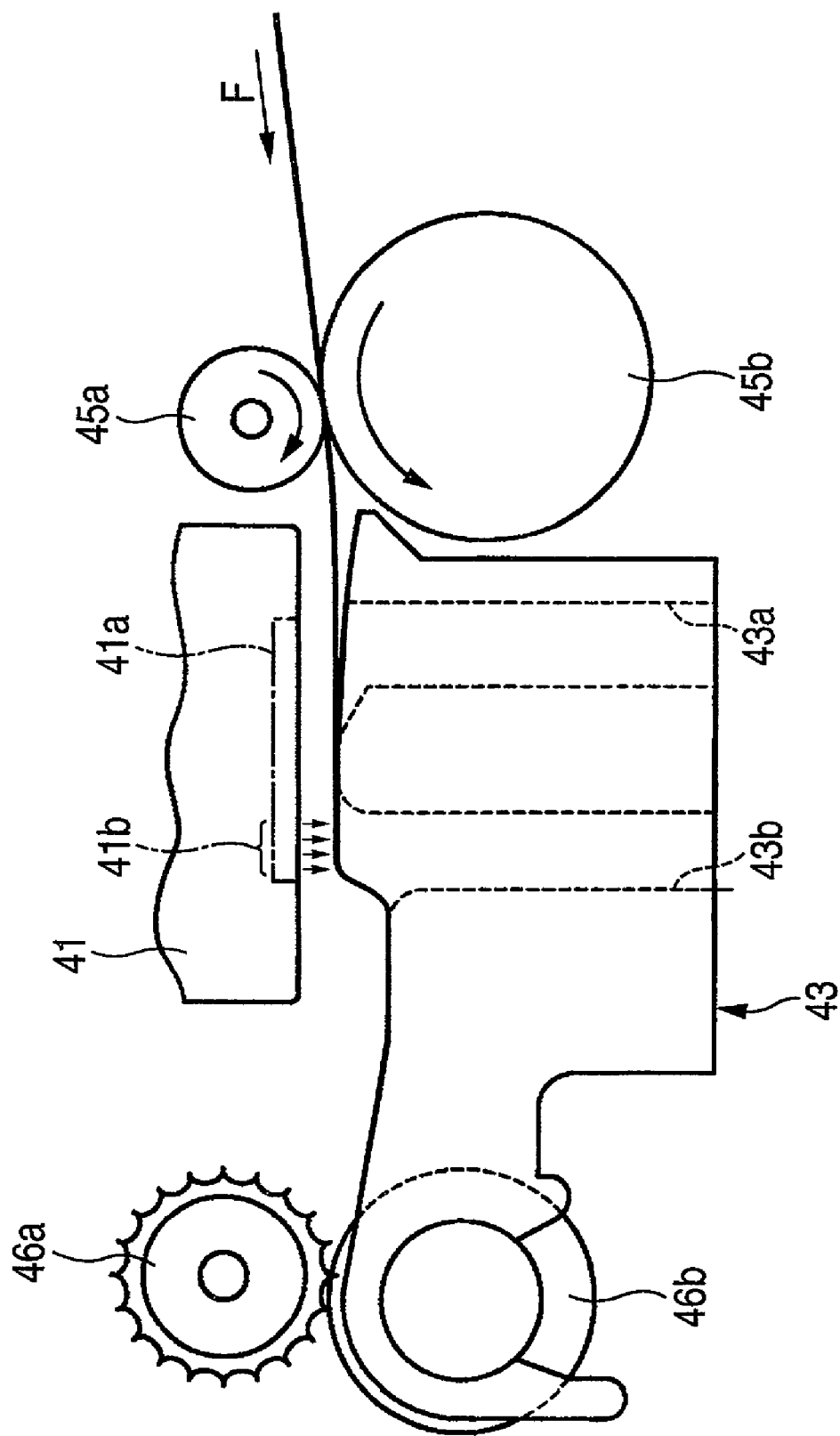
FIG. 3 is a first side diagram illustrating the platen and surroundings there of in the printer system that is the first embodiment of the invention.
Figure 4:
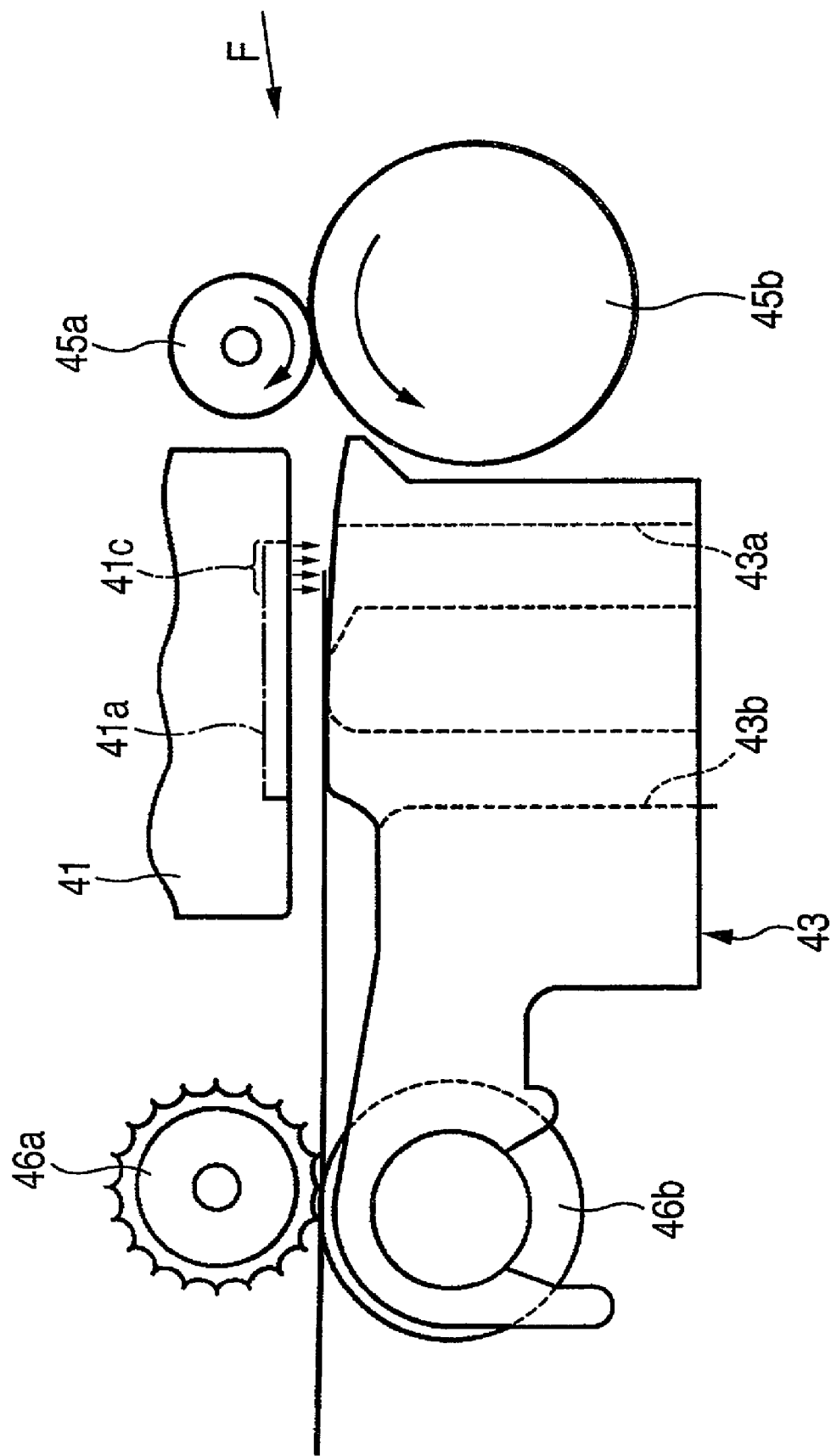
FIG. 4 is a second side diagram illustrating the platen and surroundings there of in the printer system that is the first embodiment of the invention.

Next, as illustrated in FIG. 3, when the front end portion in the paper feed direction F of the printing paper, which is actually printed, is printed, the microweaving processing portion 65a generates a printing command causing only the nozzles 41b of the plurality of nozzles 41a, which are provided in the print head 41 of the printer 30 and arranged in the paper feed direction F so that ink sprayed there from is received into the paper-discharge-side ink receiving opening 43b formed in the platen 43 of the printer 30, to spray ink. In other words, the microweaving processing portion 65a generates a printing command, which causes only the predetermined number of the paper-discharge-side nozzles 41b among the plurality of nozzles 41a arranged in the paper feed direction F to perform printing, in step S22. Upon completion of conversion of data, which is used for printing the front end portion of the printing paper, to a command, the microweaving processing portion 65a generates a command, which causes all the nozzles of the printing head 30 as usual, in step S23. Then, the microweaving processing portion 65a generates a printing command allowing only the nozzles 41c, which are adapted to spray ink so that the sprayed ink is received in the paper-feed-side ink receiving opening 43a formed in the platen 43 of the printer 30, among the nozzles 41a arranged in the paper feed direction F and provided in the print head 41 of the printer 30, as shown in FIG. 4, to squirt ink. In other words, the portion 65a creates the printing command, which permits only the predetermined number of nozzles 41c among the plurality of nozzles 41a arranged in the paper feed direction F to perform printing, in step S24.

When receiving the printing command generated in the aforementioned manner, the printer 30 commences the following printing processing according to this printing command.

A printing control portion 70 of the printer 30 drives the paper feed rollers 46a and 46b. Then, when the control portion 70 perceives from a signal sent from the sensor 48 that the front end of the printing paper reaches a place located just above the paper discharge side ink receiving opening 46b of the platen 43, as illustrated in FIGS. 2 and 3, the control portion 70 drives the print head 41 and starts printing.

Basically, in this embodiment, the expanded printing region set in the aforementioned step 4 is printed. However, the front end portion of this expanded printing region is set as the non-printing region in step S6. The printer 30 receives the printing command, which is generated in step S21 and treats the non-printing region as having no print data, that is, having "null" values. Thus, only a paper-feed-side portion extending from the front end of the necessary minimum printing region set in the aforementioned step S5 is printed.

Further, regarding the printing of the front end portion of the printing paper, the printing is performed on the necessary minimum printing region, which is extended from the front end of the printing paper toward the paper discharge tray, as illustrated in FIG. 3. Thus, the front end portion of the printing paper is reliably printed without margin. Moreover, when the front end portion of the printing paper is printed, only the nozzles 41b, which are adapted so that ink sprayed there from is received in the paper discharge side ink receiving opening 43b formed in the platen 43, among the plurality of nozzles 41a, which are provided in the print head 41 of the printer 30 and arranged in the paper feed direction F, is used according to the printing command generated in step S22. Thus, even when the front end portion of printing paper does not reach the paper discharge ink receiving opening 43b of the platen 43 owing to printing paper feed tolerance and a paper feed error, all ink sprayed at that time is received in the paper discharge side ink receiving opening 43b. This prevents the surface of the platen 43 from being smeared with ink.

Regarding the printing of the middle portion (other than the front end portion and the rear end portion) of the printing paper, the printing there of is performed by using all the nozzles 41a of the print head 41 according to the printing command generated in step S23. Incidentally, the expression "using all the nozzles 41a" means that ink is sprayed from appropriate ones of the nozzles 41a according to an image, which is to be printed, and colors there of in a state in which all the nozzles 41a can be used, instead of meaning that ink should be sprayed from all the nozzles 41a.

Regarding the printing of the lateral end portions of the printing paper, the printing there of is performed on the expanded printing region, which is sidewardly expanded from the lateral ends of the printing paper in the entire region extending in the paper feed direction. Thus, the lateral end portions of the printing paper is reliably printed without margins. Incidentally, regarding the printing of the lateral end portions of the printing paper, this embodiment is adapted so that the printing there of is performed on the expanded printing region. However, similarly as the printing of the front end portion of the printing paper, apart, which is located outside the necessary minimum printing region, of the expanded printing region may be set as a non-printing region. That is, the printer 30 may be inhibited from printing this part of the expanded printing region.

When the printing control portion 70 perceives from a signal outputted from the sensor 48 that the rear end of the printing paper reaches a place located just above the paper feed side ink receiving opening 46a of the platen 43, as illustrated in FIG. 4, only the nozzles 41c, which are adapted so that ink sprayed there from is received in the paper feed side ink receiving opening 43a formed in the platen 43, among the plurality of nozzles 41a, which are provided in the print head 41 of the printer 30 and arranged in the paper feed direction F, is used according to the printing command generated in step S24. Thus, similarly as the printing of the front end portion of the printing paper, even when the rear end portion of the printing paper passes through a place located just above the paper feed ink receiving opening 43a owing to the paper feed tolerance and a paper feed error, all the ink sprayed at that time is received in the paper feed side ink receiving opening 43a. Consequently, the surface of the platen 43 is prevented from being smeared with the ink.

When the printing control portion 70 perceives from a signal sent from the sensor 48 that a part located at a place corresponding to the dimension in the paper feed direction of the necessary minimum printing region from the front end of the necessary minimum printing region becomes the part to be printed by the print head 41, the control portion 70 causes the print head 41 to stop spraying the ink. That is, the spraying of the ink is stopped at the rear end of the necessary minimum printing region. Therefore, an area, which extends from the rear end of the necessary minimum printing region toward the paper feed cassette, is not printed. Similarly as in the case of printing of the front end portion of the printing paper, this embodiment avoids waste of ink and reduces a printing time.

Further, regarding the printing of the rear end portion of the printing paper, the printing is performed on the necessary minimum printing region, which is extended from the rear end of the printing portion toward the paper feed cassette. Thus, the rear end portion of the printing paper is reliably printed without margins.

As described above, according to the first embodiment, in the case that the marginless printing mode is designated when the marginless printing is performed, a printing region, whose size is larger than the size of printing paper to be actually printed, is automatically set. This reduces a burden imposed on a user. Moreover, even when the size of the printing paper to be actually printed is changed in a state in which the size of the printing paper is set before the document is created by the application program, a virtual expanded amount of the printing paper to be actually printed is constant, so that a user is prevented from being confused when setting the size of the printing paper. In this sense, the burden imposed on users is further lightened.

Incidentally, in the aforementioned embodiment, the front end portion of the printing paper is printed when this portion reaches a place located just above the paper discharge side ink receiving opening 43b. Further, the rear end portion of the printing paper is printed when this portion reaches a place located just above the paper feed side ink receiving opening 43a. Conversely, the printer may be adapted so that the front end portion of the printing paper is printed when this portion reaches a place just above the paper feed side ink receiving opening 43a, and that the rear end portion of the printing paper is printed when this portion reaches a place just above the paper discharge side ink receiving opening 43b.

Furthermore, in the aforementioned embodiment, the non-printing region is set in the expanded printing region and is not printed. However, no non-printing region may be provided. Further, the printer may be adapted to print the entire expanded printing region. Incidentally, in this case, an area, in which the non-printing region would be set, in the expanded printing region is printed. Thus, as compared with the first embodiment, the consumption of ink increases. Moreover, needless to say, the printing time is increased.

Figure 11:
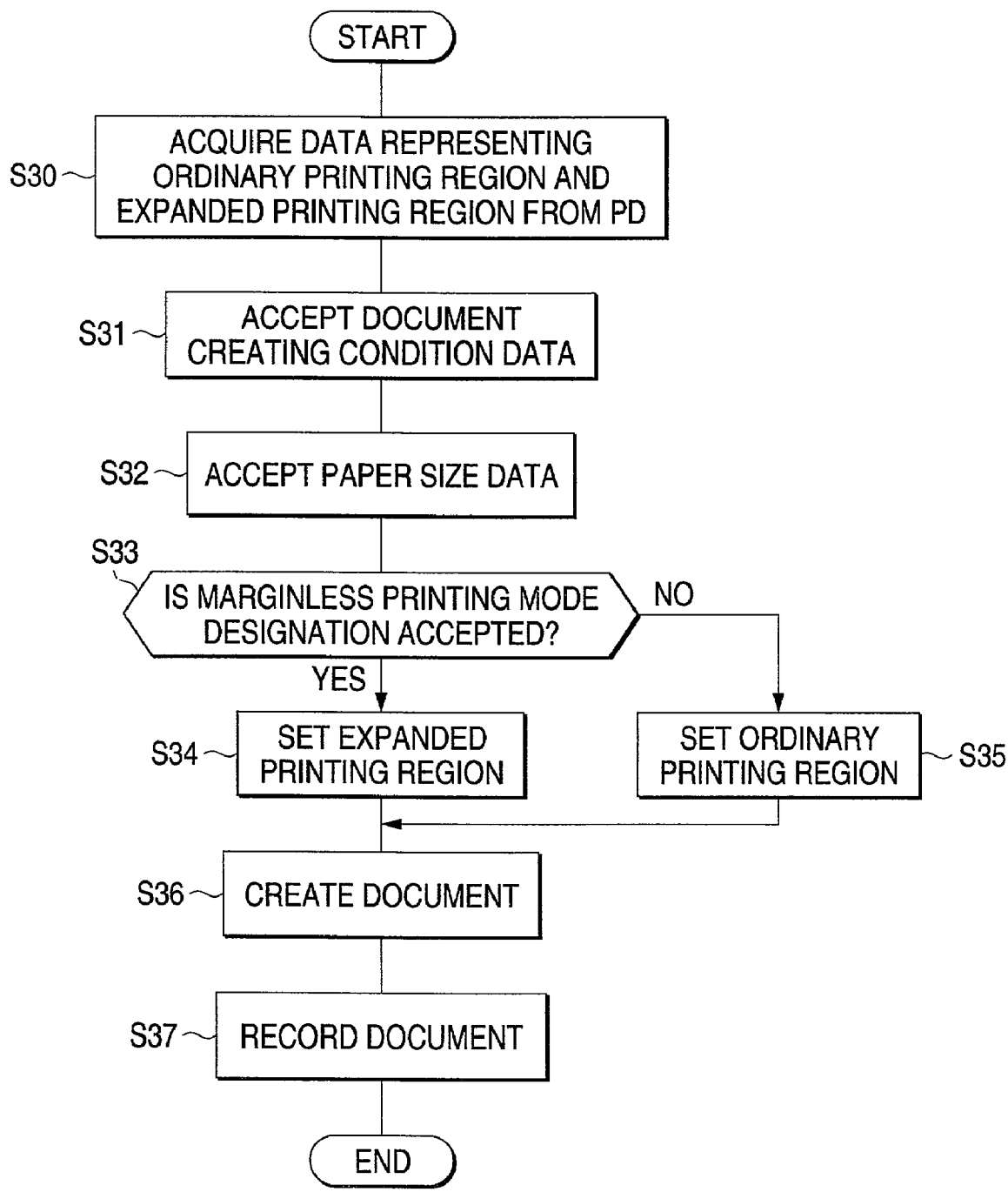
FIG. 11 is a flowchart illustrating a document creating operation to be performed by executing an application program in the first embodiment of the invention.

Additionally, the application program of the first embodiment manages the printing region by itself independent of the printer driver. However, some application program enables the size of printing paper, which is actually printed, to reflect the printing region set by the printer driver. Thus, a document creating operation of the latter application program is described herein below with reference to a flowchart of FIG. 11.

When the application program is activated, the application program acquires data, which represents the printing region, from the printer driver in step S30. At that time, the application program acquires not only the data, which represents an ordinary printing region related to the standardized size of printing paper but data representing the aforementioned expanded printing region. Incidentally, the application program may acquire the data representing the printing region every activation there of. However, the printer host may be adapted so that the data representing the printing region is acquired only at the first activation of the application program, and that such data representing the printing region is stored and thereafter, the stored data is used.

When data representing document creating conditions is accepted in step S31, data representing the size of printing paper to be actually is then accepted in step S32. After the application program accepts the data representing the size of the printing paper, when the application program accepts a marginless printing mode designation in step S33, the application program sets an expanded printing area, which is related to the data accepted in step S32 as representing the standardized size of the printing paper, as the printing region in step S34. Conversely, when the application program does not accept a marginless printing mode designation in step S33, the application program sets an ordinary printing area, which is related to the data accepted in step S32 as representing the standardized size of the printing paper, as the printing region in step S35. Incidentally, the data representing the marginless printing mode designation may be acquired indirectly from the printer driver by receiving there from such data accepted by the printer driver. Alternatively, the application program may directly accept such data.

Thereafter, the application program performs a document creating operation in step S36, and also performs a document recording operation in step S37. Then, the application program is terminated.

As described above, this example automatically sets the expanded printing region in a state, in which the marginless printing mode designation is accepted when a document is created. Thus, similarly as the first embodiment, this example eliminates the necessity for selecting the custom printing paper and for setting the expanded printing region corresponding to this custom printing paper. Consequently, as compared with the first embodiment, this example reduces the burden imposed on a user still more. In other words, according to this example, in the case that a user wishes to select a marginless printing mode, when the user sets the size of printing paper to be actually printed and also sets the marginless printing mode, it is sufficient for the user to create a document by using the entire region, which is set by the application program, as usual.

Figure 12:
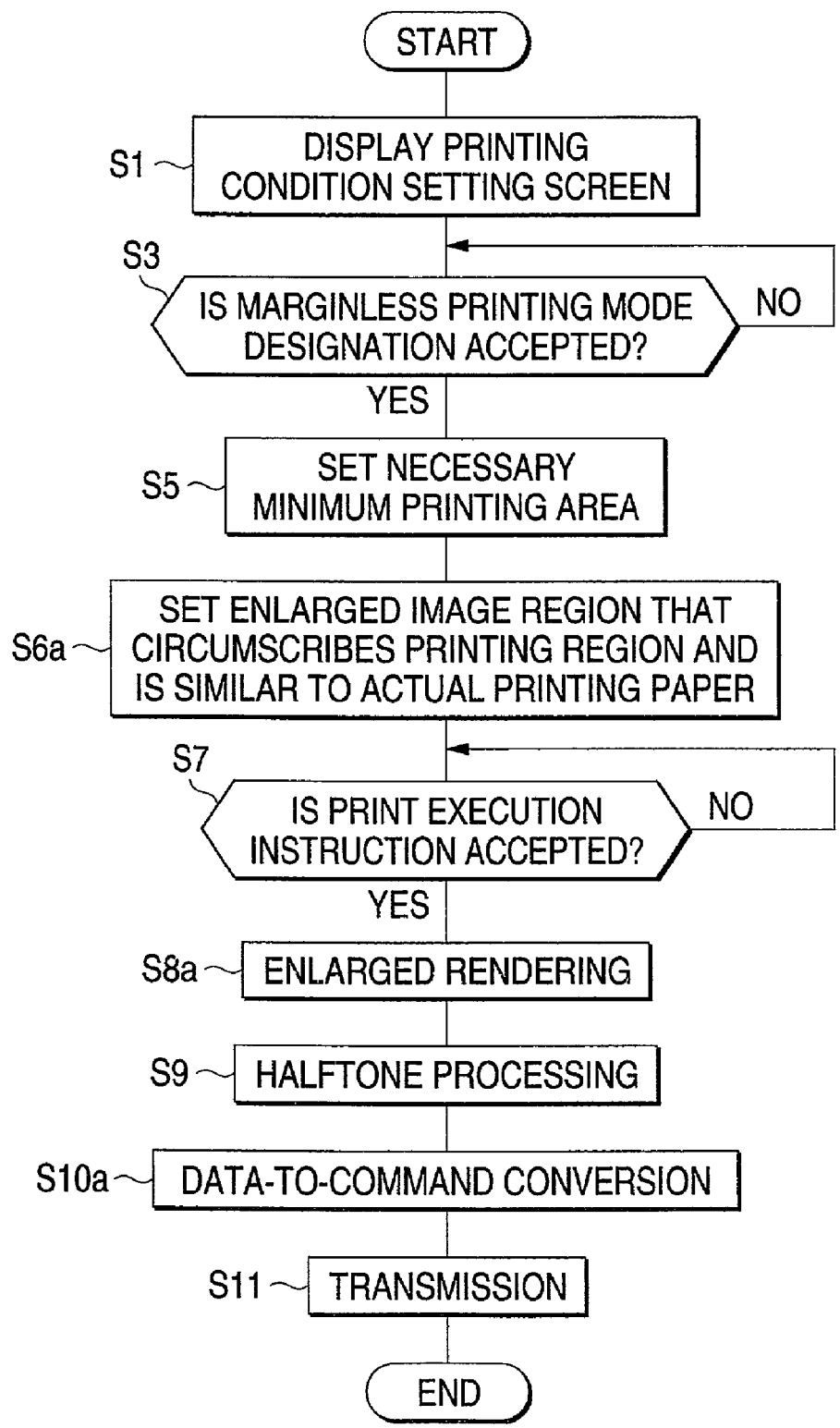
FIG. 12 is a flowchart illustrating an operation of a printer driver of a second embodiment of the invention.

Next, another printer system, which is a second embodiment of the invention, is described here in below with reference to FIGS. 12 to 14. Incidentally, the printer system of this embodiment slightly differs from the first embodiment only in operation of each of the functional constituent elements. Fundamentally, the hardware and functional configurations of the second embodiment is similar to those of the first embodiment. Therefore, the description of the hardware and functional configurations of the second embodiment are omitted herein. Further, only an operation of the second embodiment is described here in below.

In the case of this embodiment, a user does not need to set imaginary printing paper, whose size is larger than the size of printing paper to be actually printed, differently from the case of the first embodiment. Similarly as described in the last part of the description of the first embodiment, a user sets the size of printing paper to be actually printed and creates the document 51 within the entire surface of the paper of this size, as usual.

Upon completion of creation of this document 51, the printer driver 55 is activated so as to print this document. Hereinafter, an operation of this printer driver 55 is described with reference to a flowchart of FIG. 12.

When the printer driver 55 is activated, the printing condition setting display similar to that of the first embodiment is displayed on the screen of the display unit 12 by the user interface 59 of this printer driver 55 in step S1. The user interface 58 accepts a marginless printing mode designation from a user in step S3. This printing condition is recorded in the printing condition file 59 by the integrated management portion 60. In the second embodiment, the size of printing paper, which is set by the application program 50, is equal to that of printing paper to be actually printed, as described above. Thus, operations to be performed in step S2 of the first embodiment, that is, the user's setting and acceptance of data representing the size of the printing paper to be actually printed are not performed. Incidentally, this means that the data representing the paper size, which is sent from the user, is not accepted. Needless to say, actually, the data representing the size of the printing paper, which is sent from the application program 50, is accepted and then recorded in the printing condition file 59.

When the "marginless printing mode designation" is accepted, the marginless printing condition setting portion 56 is activated according to an instruction from the integrated management portion 60. Immediately after this, the necessary minimum printing region is set in step S5 without setting the expanded printing region, which would be set in step S4 in the first embodiment. In the first embodiment, the expanded printing region is set for convenience of the user who should set imaginary printing paper, whose size is larger than that of the printing paper to be actually printed, in a stage, in which the paper size is set by the application program, as described above. However, in the second embodiment, the size of printing paper, which is set by the application program, is equal to the size of printing paper to be actually printed, as usual. Thus, basically, there is no need for taking a user's convenience into consideration when the paper size is set. Consequently, the expanded printing region is not set in the second embodiment.

As described above with reference to FIG. 10, the necessary minimum expanded amount corresponding to each of the sizes of printing paper to be printed by the printer 30 is preliminarily recorded in the printing condition file 59. The marginless printing condition setting portion 56 determines the size of the necessary minimum printing region in the case, in which marginless printing is performed on the printing paper of the size to be actually printed, by referring the data recorded in this file.

Figure 14:
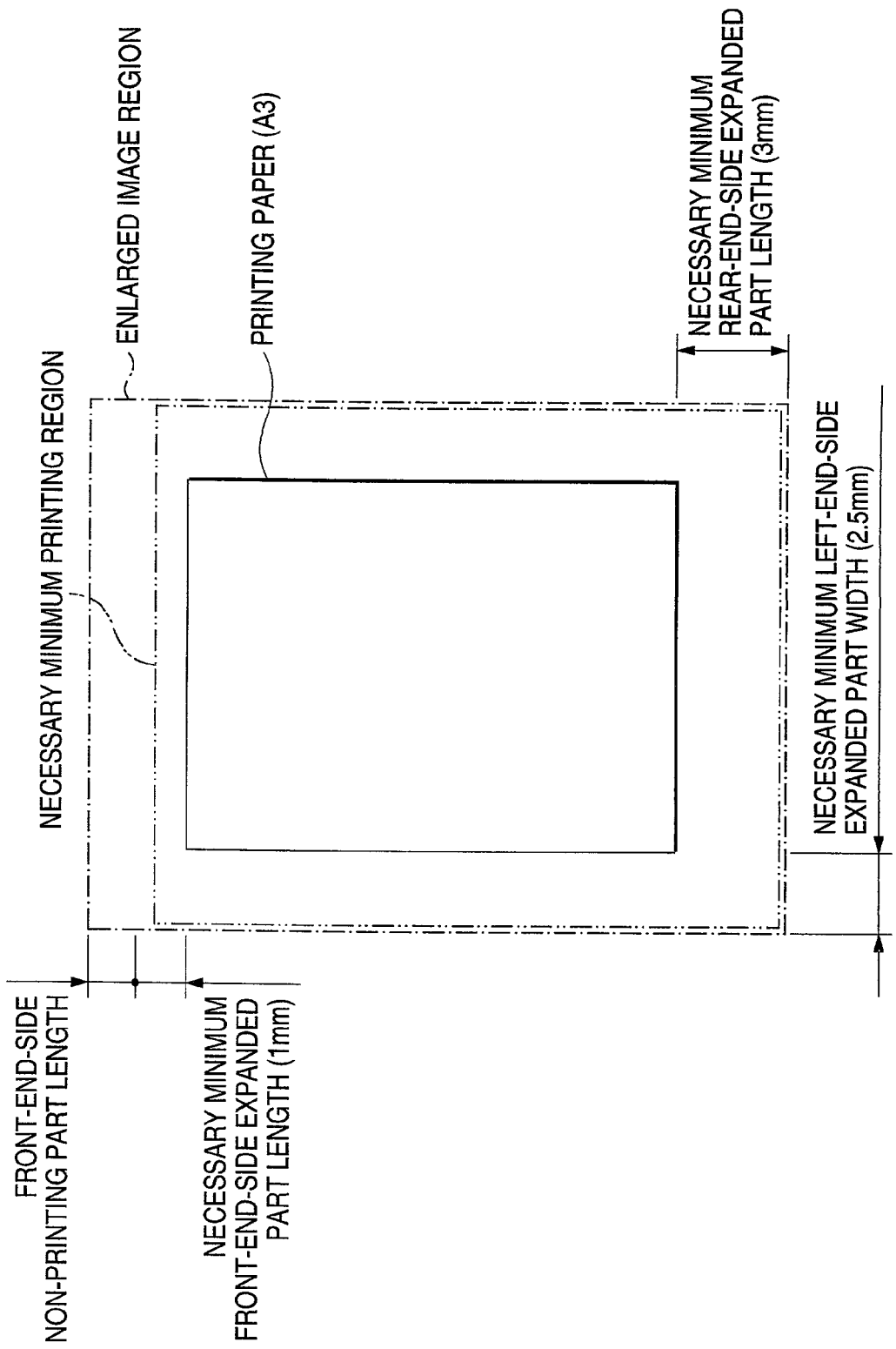
FIG. 14 is a diagram illustrating the relation among a sheet of printing paper, a necessary minimum printing region, and an enlarged image region in the second embodiment of the invention.

Subsequently, as shown in FIG. 14, the marginless printing condition setting portion 56 sets an enlarged image region that circumscribes at least a part of the necessary minimum printing region determined in step S5 and that is similar to the printing paper to be actually printed, namely, that has an aspect ratio equal to that of the printing paper to be actually printed. Then, the enlargement ratio of the enlarged region size to the size of the printing paper to be actually printed is determined in step S6a.

In the second embodiment, the non-printing region, which is set in step S6 in the first embodiment, is not set in the aforementioned process. This is because of the fact that the printing region of the first embodiment is basically an expanded printing region, while the printing region of the second embodiment is a necessary minimum printing region for performing marginless printing, so that there are no non-printing regions in this printing region of the second embodiment.

The user interface 58 waits for a printing execution instruction from a user. When the user interface 58 accepts a printing execution instruction, the interface 58 informs the integrated management portion 60 of the printing execution instruction in step S7. When the integrated management portion 60 accepts the printing execution instruction from the user interface 58, the management portion 60 instructs the renderer 63 to perform rendering. When receiving this instruction, the renderer 63 converts drawing data, which constitutes a document stored in the spool file 62, into RGB image data and enlarges this image data at the ratio of enlargement there of determined in step S6a. Then, this enlarged RGB image data is developed in the image data development region in step S8a.

Subsequently, similarly as the first embodiment, this RGB image data is converted into CMYKcm binary image data in the halftone processing portion 64 in step S9. Then, in step S10a, the integrated management portion 60 causes the data-to-command conversion portion 65 to convert this CMYKcm binary image data into a printing command, which can be interpreted by the printer 30, according to the printing condition in the previous step. Subsequently, this printing command is transmitted from the transmitting/receiving portion 66 to the printer 30 in step S11.

Figure 13:
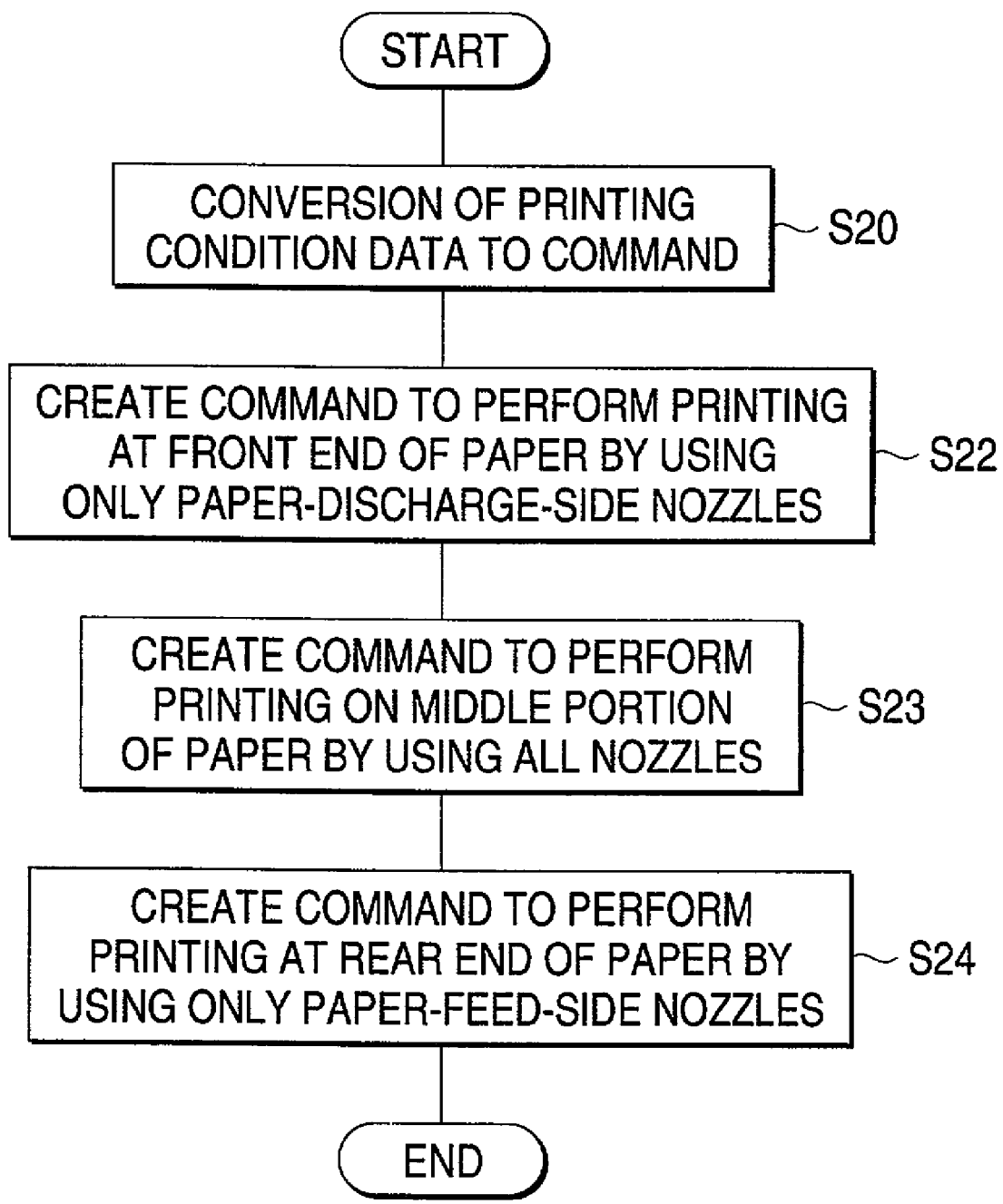
FIG. 13 is a flowchart illustrating an operation of a data-to-command conversion portion of the second embodiment of the invention.

The data-to-command conversion portion 65 for performing data-to-command conversion in step S10a performs conversion of data representing various printing conditions into a command in step S20, as illustrated in a flowchart of FIG. 13.

Subsequently, similarly as the first embodiment, when the front end portion in the paper feed direction F of the printing paper to be actually printed is printed, the microweaving processing portion 65a of the data-to-command conversion portion 65 generates a printing command, which causes only the predetermined number of paper-discharge-side nozzles 41b to perform printing, among the plurality of nozzles 41a arranged in the paper feed direction F, in step S22. Upon completion of data-to-command conversion of data for printing the front end portion of this printing paper, the microweaving processing portion 65a generates a printing command, which uses all the nozzles of the print head 41 as usual, in step S23. Further, when the rear end portion in the paper feed direction of the printing paper is printed, the microweaving processing portion 65a generates a printing command, which causes only the predetermined number of paper-feed-side nozzles 41c among the plurality of nozzles 41a arranged in the paper feed direction F to perform printing, in step S24.

Incidentally, in the second embodiment, among the image data, image data corresponding to regions located outside the necessary minimum printing region are not converted to commands in the data-to-command conversion process, because such image data are data corresponding to regions located outside the printing region.

When receiving the printing command generated in the aforementioned manner, the printer 30 starts printing according to this printing command.

Even in the case of the second embodiment, the printer 30 reliably prints each of end portions of the printing paper without margins, because printing is performed on the necessary minimum printing region, which is larger than the size of the printing paper to be actually printed, similarly as that of the first embodiment. Furthermore, in the case of printing the front end portion and the rear end portion of the printing paper, only the nozzles 41b and 41c, which are adapted so that ink sprayed there from is received in the ink receiving openings 43a and 43b formed in the platen 43, are used. Thus, even when printing-paper feed tolerance and a paper feed error are caused, the surface of the platen 43 is prevented from being smeared with ink.

Further, in the case of the second embodiment, in a paper size setting stage before a document is created by the application program 50, a user can set a paper size as usual without concern for marginless printing. Thus, the second embodiment reduces a burden imposed on the user still more, as compared with the first embodiment. Especially, this effect is effective in the case where the application program, such as New Year's card creating software, sets the printing region independent of the printer driver, that is, the case of using the application program of the first embodiment.

Figure 15:
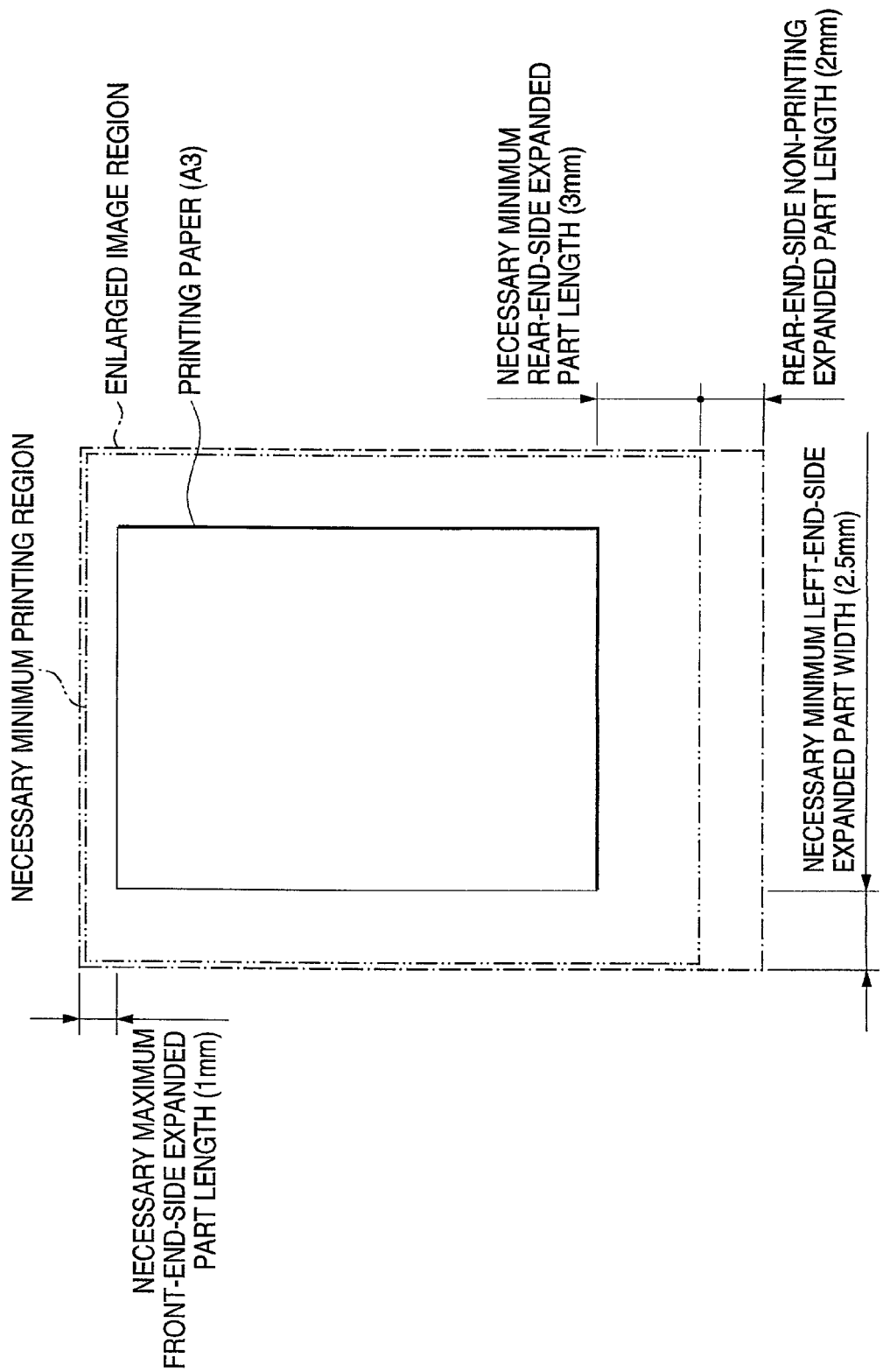
FIG. 15 is a diagram illustrating the relation among a sheet of printing paper, a necessary minimum printing region, and an enlarged image region in a modification of the second embodiment of the invention.
Figure 16:
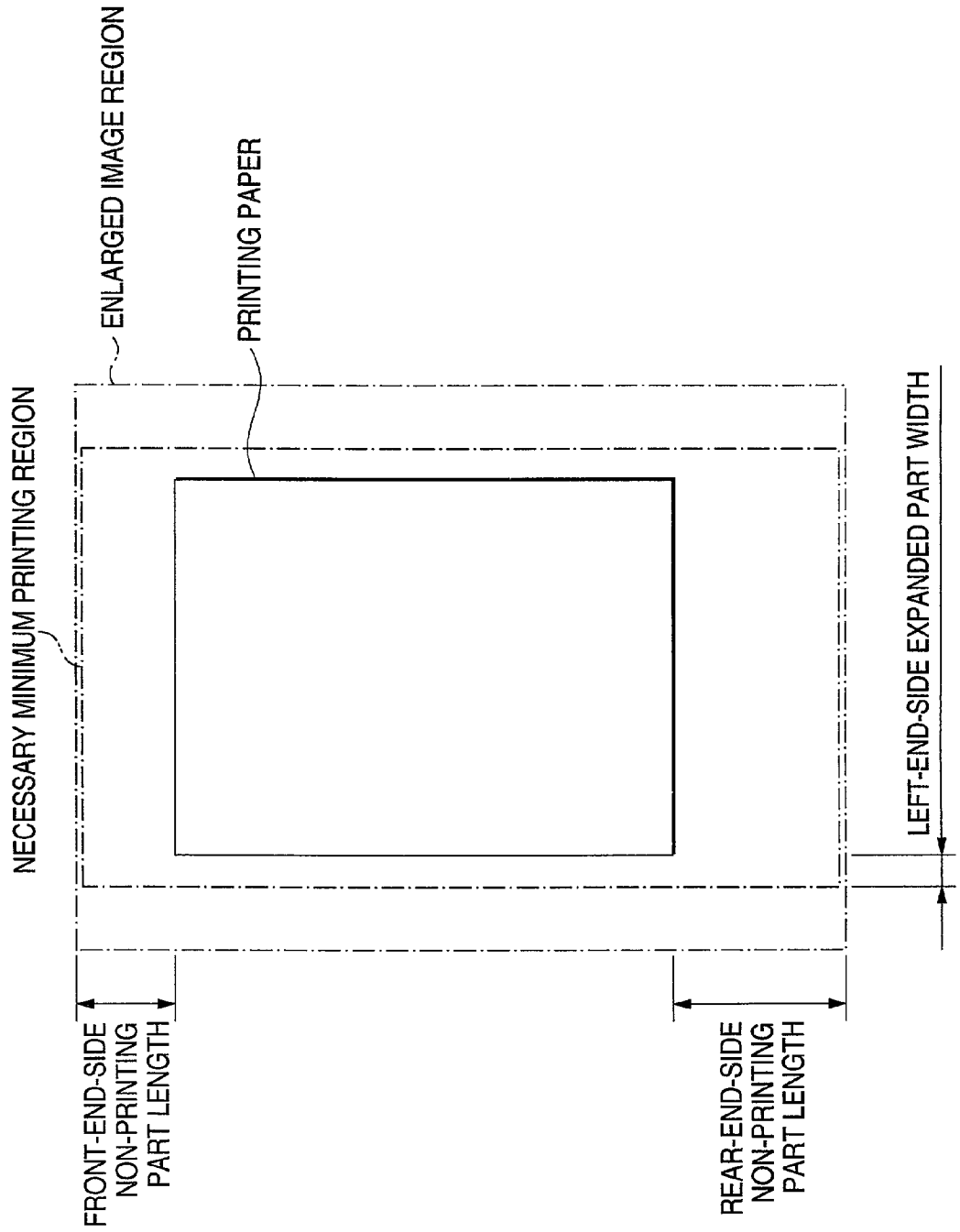
FIG. 16 is a diagram illustrating the relation among a sheet of printing paper, a necessary minimum printing region, and an enlarged image region in another modification of the second embodiment of the invention.

Incidentally, according to the second embodiment, the enlarged image region is set in such a way as to circumscribe the rear end side and the lateral sides of the necessary minimum printing region, as illustrated in FIG. 14. However, the enlarged image region may be set in such a way as to circumscribe the front end side and the lateral sides of the necessary minimum printing region, as illustrated in, for example, FIG. 15. Alternatively, the enlarged image region may be set in such away as to circumscribe only the lateral sides of the necessary minimum printing region. Further, as illustrated in FIG. 16, in the case that the front-end-side expanded amount and the rear-end-side expanded amount of the necessary minimum printing region are larger than the lateral-side expanded amount there of, the enlarged image region may be set in such a manner as to circumscribe the front end side and the rear end side of this printing region.

Next, another printer system, which is a third embodiment of the invention, is described here in below with reference to FIGS. 17 to 18. Incidentally, the printer system of this embodiment slightly differs from the first embodiment only in operation of each of the functional constituent elements. Fundamentally, the hardware and functional configurations of the third embodiment is similar to those of the first embodiment. Therefore, the description of the hardware and functional configurations of the third embodiment are omitted herein. Further, only an operation of the third embodiment is described here in below.

Although the enlarged image region is set in such a manner as to circumscribe the necessary minimum printing region of the second embodiment, an enlarged image region is set in the case of the third embodiment in such a way as to circumscribe the expanded printing region described in the foregoing description of the first embodiment.

Figure 17:
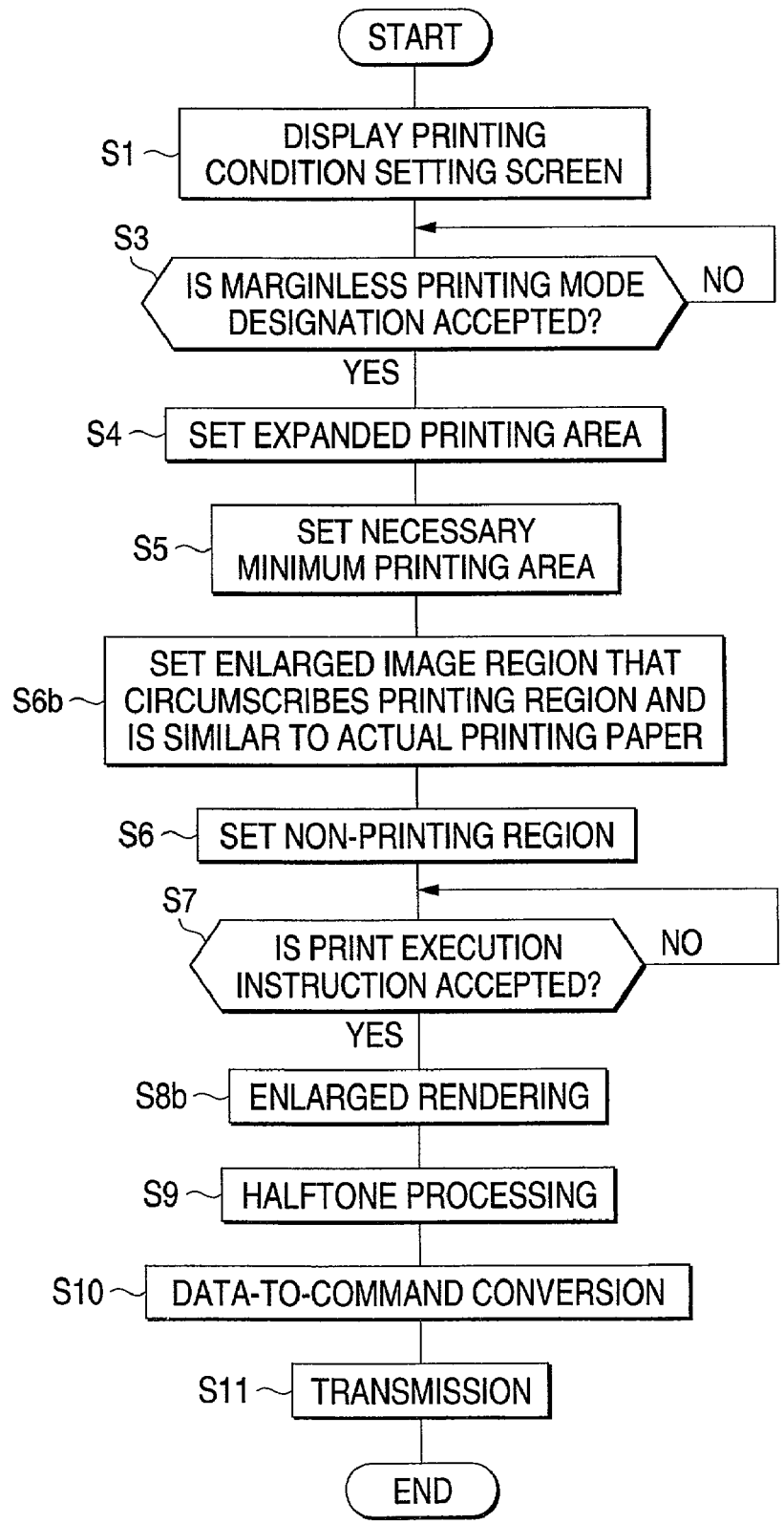
FIG. 17 is a flowchart illustrating an operation of a printer driver of a third embodiment of the invention.

As illustrated in a flowchart of FIG. 17, when the printer driver 55 is activated, the user interface 58 of this printer driver 55 indicates a printing condition setting display on the screen of the display unit 12 in step S1, similarly as that of the second embodiment. Thereafter, the user interface 58 accepts a "marginless printing mode designation" sent from a user in step S3.

When the user interface 58 accepts the "marginless printing mode designation", the integrated management portion 60 instructs the marginless printing condition setting portion 56 to be activated and to then set an expanded printing region in step S4 and to subsequently set a necessary minimum printing region in step S5.

Figure 18:
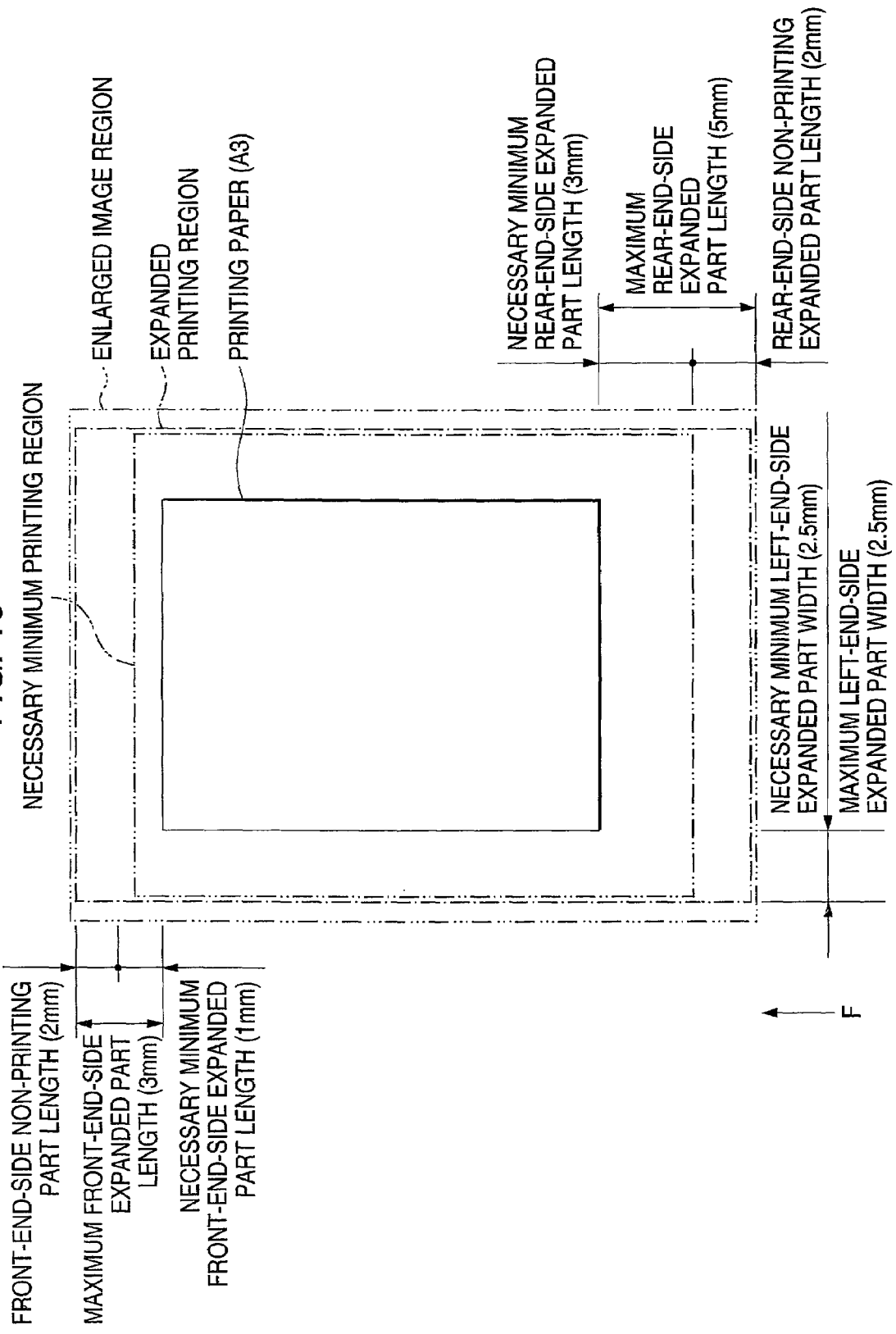
FIG. 18 is a diagram illustrating the relation among a sheet of printing paper, a necessary minimum printing region, and an enlarged image region in the third embodiment of the invention.

Subsequently, as illustrated in FIG. 18, the marginless printing condition setting portion 56 sets an enlarged image region in such a way as to circumscribe at least a part of the expanded printing region set in step S4 and as to be similar to printing paper to be actually printed, that is, as to have an aspect ratio equal to that of the printing paper to be actually printed. Then, in step S6b, the setting portion 56 determines an enlargement ratio of the enlarged image region to the printing paper to be actually printed. Furthermore, the marginless printing condition setting portion 56 determines a portion, which extends from the an end of the expanded printing region to a place corresponding to the difference between the expanded amount of the expanded printing region and the necessary minimum expanded amount, of the expanded printing region determined in step S4 as a non-printing region in step S6, similarly as that of the first embodiment.

The user interface 58 waits for a printing execution instruction from a user. When the user interface 58 accepts a printing execution instruction, the interface 58 informs the integrated management portion 60 of the printing execution instruction in step S7. When the integrated management portion 60 accepts the printing execution instruction from the user interface 58, the management portion 60 instructs the renderer 63 to perform rendering. When receiving this instruction, the renderer 63 converts drawing data, which constitutes a document stored in the spool file 62, into RGB image data and enlarges this image data at the enlargement ratio determined in step S6b, similarly as that of the second embodiment. Then, this enlarged RGB image data is developed in the image data development region in step S8b. Incidentally, in the third embodiment, a region circumscribing the expanded printing region is set as an enlarged image region. Thus, the enlargement ratio of the image data is large, as compared with the second embodiment that sets the region circumscribing the necessary minimum printing region as the enlarged image region.

Subsequently, similarly as the second embodiment, this RGB image data is converted into CMYKcm binary image data in the halftone processing portion 64 in step S9. Then, in step S10, the integrated management portion 60 causes the data-to-command conversion portion 65 to convert this CMYKcm binary image data into a printing command, which can be interpreted by the printer 30, according to the printing condition in the previous step. Subsequently, this printing command is transmitted from the transmitting/receiving portion 66 to the printer 30 in step S11. Incidentally, the data-to-command conversion portion 65 for performing the data-to-command conversion in step S10 performs an operation similar to the operation performed by the corresponding portion of the first embodiment. Thus, when receiving the command, to which the data is converted by the conversion portion 65, the printer 30 performs an operation similar to the operation performed by the printer in the case of the first embodiment.

As described above, in the third embodiment of the invention, when the printer driver 55 accepts a marginless printing mode designation, an image is automatically enlarged, similarly as in the first embodiment of the invention. Thus, a user can set a paper size at a paper size setting stage, at which no document is created by the application program 50, without concern for marginless printing, as usual. Further, in the third embodiment, the enlarged image region is set on the basis of the expanded printing region, which is not affected by the kind of the printer, differently from the second embodiment. Therefore, even when the printer is replaced with a different printer, an enlargement ratio of an image can be maintained at a constant value.

Incidentally, although the enlarged image region is set in such a way as to circumscribe the expanded printing region, the enlarged image region may be set in such a manner as to inscribe the expanded printing region or a region that is larger than this expanded printing region.

According to the invention, in the case that a marginless printing mode is designated when marginless printing is performed, a printing region, whose size is larger than that of actual printing paper to be printed, is set to thereby lighten a burden imposed on a user.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A computer readable medium storing a computer program of a printer host for converting drawing data, which is created by an application program and corresponds to a sheet of printing paper having a specific size, to a printing command and for transmitting the printing command to said printer, said computer program comprising:

a marginless printing mode designation accepting step of accepting a marginless printing mode designation;

a marginless printing condition setting step of setting, when said marginless printing mode designation is accepted in said marginless printing mode designation accepting step, a printing region of a size that is larger than the specific size of printing paper to be actually printed; and a printing command generating step of converting the drawing data to said printing command so that an image represented by the drawing data is enlarged according to a size of the printing region set in said marginless printing condition setting step, and that said printer performs printing within the printing region, wherein the computer readable medium is adapted to preliminarily store data representing a necessary minimum expanded amount corresponding to each of sizes of printing paper to be used for performing marginless printing in said printer connected to said printer host, and which stores the operation program of said printer host, in which a necessary minimum printing area serving as the printing region according to the necessary minimum expanded amount corresponding to the printing paper of the specific size, which is actually printed, and an enlarged image region, which circumscribes said necessary minimum printing region and is similar to said printing paper, are determined in said marginless printing condition setting step, and in which, in said printing command generating step, an image represented by the drawing data is enlarged at a ratio of enlargement of a size of said enlarged image region to the specific size of the printing paper and the drawing data is converted into the printing command so that said printer performs printing within said necessary minimum printing area determined as said printing region in said printing command generating step.

2. A computer readable medium storing a computer program of a printer host for converting drawing data, which is created by an application program and corresponds to a sheet of printing paper having a specific size, to a printing command and for transmitting the printing command to said printer, said computer program comprising:

a marginless printing mode designation accepting step of accepting a marginless printing mode designation;

a marginless printing condition selling step of setting, when said marginless printing mode designation is accented in said marginless printing mode designation accepting step, a printing region of a size that is larger than the specific size of printing paper to be actually printed; and a printing command generating step of converting the drawing data to said printing command so that an image represented by the drawing data is enlarged according to a size of the printing region set in said marginless printing condition setting step, and that said printer performs printing within the printing region, wherein the computer readable medium is adapted to store the operation program of said printer host, in which an expanded amount of said printing region is a maximum expanded amount among necessary minimum expanded amounts respectively corresponding to marginless printing operations performed on printing paper of sizes by printers, in which a necessary minimum printing area is determined according to the maximum expanded amount corresponding to the printing paper of the specific size, which is actually printed, and an enlarged image region, which circumscribes said necessary minimum printing region and is similar to said printing paper, is also determined in said marginless printing condition setting step, and in which, in said printing command generating step, an image represented by the drawing data is enlarged at a ratio of enlargement of a size of said enlarged image region to the specific size of the printing paper and the drawing data is converted into the printing command so that said printer performs printing within said necessary minimum printing area determined as said printing region in said printing command generating step.

3. A computer readable medium storing a computer program of a printer host for converting drawing data, which is created by an application program and corresponds to a sheet of printing paper, whose size is larger than a specific size of a sheet of printing paper to be actually printed, to a printing command and for transmitting the printing command to a printer, said computer program comprising:

a paper size data accepting step of accepting data designating the specific size of a sheet of printing paper to be actually printed;

a marginless printing mode designation accepting step of accepting a marginless printing mode designation;

a marginless printing condition setting step of setting, when said marginless printing mode designation is accepted in said marginless printing mode designation accepting step, a printing region of a size that is larger than the specific size of printing paper to be actually printed; and a printing command generating step of converting the drawing data to said printing command so that said printer performs printing within the printing region, wherein the storage medium is adapted to store the operation program of said printer host, in which an expanded amount of said printing region set in said marginless printing condition setting step correspondingly to the specific size of printing paper to be actually printed is constant even when the specific size thereof changes, and wherein the computer readable medium is adapted to store the operation program of said printer host, in which the expanded amount of said printing region is a maximum expanded amount among necessary minimum expanded amounts respectively corresponding to marginless printing operations performed on printing paper of sizes by printers, and adapted to preliminarily store data representing a necessary minimum expanded amount corresponding to each of sizes of printing paper to be used for performing marginless printing is preliminarily stored in said printer connected to said printer host, in which, in said marginless printing condition setting step, when the expanded amount of said printing region is larger than the necessary minimum expanded amount corresponding to the printing paper of the specific size to be actually printed, a portion extending from an end of said printing region to a place corresponding to a difference between the expanded amount of said printing region and the necessary minimum expanded amount is determined as a non-printing region, and in which, in said printing command generating step, a command, which indicates that said non-printing region has no print data, is generated as the printing command.

4. A computer readable medium storing a computer program of a printer host for converting drawing data, which is created by an application program and corresponds to a sheet of printing paper, whose size is larger than a specific size of a sheet of printing paper to be actually printed, to a printing command and for transmitting the printing command to a printer, said computer program comprising:

a paper size data accepting step of accepting data designating the specific size of a sheet of printing paper to be actually printed;

a marginless printing mode designation accepting step of accepting a marginless printing mode designation;

a marginless printing condition setting step of setting, when said marginless printing mode designation is accented in said marginless printing mode designation accepting step, a printing region of a size that is larger than the specific size of printing paper to be actually printed; and a printing command generating step of converting the drawing data to said printing command so that said printer performs printing within the printing region, wherein the storage medium is adapted to store the operation program of said printer host, in which an expanded amount of said printing region set in said marginless printing condition setting step correspondingly to the specific size of printing paper to be actually printed is constant even when the specific size thereof changes, and wherein the computer readable medium is adapted to store the operation program of said printer host, in which the expanded amount of said printing region is a maximum expanded amount among necessary minimum expanded amounts respectively corresponding to marginless printing operations performed on printing paper of sizes by printers, and adapted to preliminarily store data representing a necessary minimum expanded amount corresponding to each of sizes of printing paper to be used for performing marginless printing is preliminarily stored in said printer connected to said printer host, in which, in said marginless printing condition setting step, when the expanded amount of said printing region is larger than the necessary minimum expanded amount corresponding to the printing paper of the specific size to be actually printed, a dimension of a necessary minimum printing region at marginless printing is determined from the specific size of the printing paper to be actually printed and from the necessary minimum expanded amount, and in which, in said printing command generating step, the dimension of said necessary minimum printing region, which is determined in said marginless printing condition setting step, is converted into a command to thereby inhibit said printer from printing outside of an area determined by the dimension of said necessary minimum printing region.

5. A computer readable medium storing a computer program of a printer driver, which operates on a host computer enabled to use a printer, said printer driver enabled to cause said host computer to perform an operation, comprising:

a paper size data accepting step of accepting data designating the specific size of a sheet of printing paper to be actually printed;

a marginless printing command creating instruction accepting step of accepting a marginless printing command creating instruction;

a drawing data receiving step of receiving drawing data generated by an application program;

a marginless printing condition setting step of setting, when said marginless printing command creating instruction is accepted in said marginless printing command creating instruction accepting step, a printing region of a size that is larger than the specific size of printing paper to be actually printed;

a printing command generating step of generating a printing command by enlarging an image, which is represented by drawing data received in said drawing data receiving step, to a size of said printing region set in said marginless printing condition setting step; and a printing command output step for outputting a printing command, which is generated in said printing command generating step, to said printer, wherein the computer readable medium is adapted to store the printer driver that causes said host computer to perform a step of acquiring a necessary minimum expanded amount corresponding to each of sizes of printing paper, on which marginless printing is performed by said printer, and that determines a necessary minimum printing region according to a necessary minimum expanded amount corresponding to the printing paper of the size represented by the data, which is accepted in said paper size data accepting step, and that sets a region, which circumscribes said necessary minimum printing region and is similar to said printing paper of the size, in said marginless printing condition setting step.

6. The computer readable according to claim 5, wherein the computer readable medium storing the computer program of a printer driver the determines the necessary minimum printing region according to the necessary minimum expanded amount corresponding to the printing paper of the size represented by the data, which is accepted in said paper size data accepting step, and that sets the region, which circumscribes said necessary minimum printing region at a front end side in a paper feed direction of said printer and is similar to said printing paper of the size, in said marginless printing condition setting step.

7. A computer readable medium storing a computer of a printer driver, which operates on a host computer enabled to use a plurality of different models of printers, said printer driver enabled to cause said host computer to perform an operation, comprising:

a paper size data accepting step of accepting data designating the specific size of a sheet of printing paper to be actually printed;

a marginless printing command creating instruction accepting step of accepting a marginless printing command creating instruction;

a drawing data receiving step of receiving drawing data generated by an application program;

a marginless printing condition setting step of setting, when said marginless printing command creating instruction is accepted in said marginless printing command creating instruction accepting step, an expanded printing region is determined from a maximum expanded amount, which is preliminarily determined from a necessary minimum expanded amount corresponding to each of sizes of printing paper used when marginless printing is performed in each of said plurality of different models of printers, and the size of printing paper, which is represented by in said paper size data accepting step, and setting a region, which circumscribes the expanded printing region and is similar to the printing paper of the size as a printing region;

a printing command generating step of generating a printing command by enlarging an image, which is represented by drawing data received in said drawing data receiving step, to a size of said printing region set in said marginless printing condition setting step; and a printing command output step for outputting a printing command, which is generated in said printing command generating step, to said printers.

8. The computer readable medium according to claim 7, wherein the computer readable medium storing the computer program of the printer driver sets the region, which circumscribes said expanded printing region at a front end side in a paper feed direction of each of said printers and is similar to said printing paper of the size, in said marginless printing condition setting step.

* * * * *